United States Patent
Ishino

(10) Patent No.: US 9,904,421 B2
(45) Date of Patent: Feb. 27, 2018

(54) TOUCH SENSOR BOARD, IMAGE DISPLAY DEVICE, AND TOUCH SENSOR BOARD MANUFACTURING METHOD

(71) Applicant: NLT Technologies, Ltd., Kanagawa (JP)

(72) Inventor: Takayuki Ishino, Kanagawa (JP)

(73) Assignee: NLT TECHNOLOGIES, LTD., Kawasaki, Kanagawa (JP)

(*) Notice: Subject to any disclaimer, the term of this patent is extended or adjusted under 35 U.S.C. 154(b) by 0 days.

(21) Appl. No.: 14/625,198

(22) Filed: Feb. 18, 2015

(65) Prior Publication Data
US 2015/0234500 A1    Aug. 20, 2015

(30) Foreign Application Priority Data
Feb. 18, 2014 (JP) ................................. 2014-028423

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .................. G06F 3/044; G06F 3/0412; G06F 2203/04111; G06F 2203/04103
(Continued)

(56) References Cited

U.S. PATENT DOCUMENTS

| 2010/0026661 A1* | 2/2010 | Teramoto | G06F 3/044 345/174 |
| 2010/0073310 A1* | 3/2010 | Liang | G06F 3/044 345/173 |

(Continued)

FOREIGN PATENT DOCUMENTS

| JP | 2009-265748 A | 11/2009 |
| JP | 2010-140370 A | 6/2010 |

(Continued)

OTHER PUBLICATIONS

Communication dated Oct. 3, 2017, from the Japanese Patent Office in counterpart application No. 2014-028423.

(Continued)

*Primary Examiner* — Koosha Sharifi-Tafreshi
(74) *Attorney, Agent, or Firm* — Sughrue Mion, PLLC

(57) ABSTRACT

To provide a touch sensor board and the like capable of improving the visibility of the screen and the manufacture yield simultaneously. The touch sensor board includes a plurality of mutually parallel first electrodes extended along a first direction and a plurality of mutually parallel second electrodes extended along a second direction. Regarding the first and second electrodes, one of those is connected to each electrode element via a same-layer connection pattern while the other is connected to each electrode element via a different-layer connection pattern. The same-layer connection pattern and the different-layer connection pattern overlap on one another via an interlayer film formed by an insulator. Further, the interlayer film is continued from the overlapping part between the same-layer connection pattern and the different-layer connection pattern via a gap part between each of the electrode elements, and the interlayer film is formed to be continued in the gap part.

8 Claims, 25 Drawing Sheets

(58) Field of Classification Search
USPC .................................................. 345/173, 174
See application file for complete search history.

(56) References Cited

U.S. PATENT DOCUMENTS

| | | | | |
|---|---|---|---|---|
| 2011/0134055 A1* | 6/2011 | Jung | ........................ | G06F 3/044 345/173 |
| 2012/0050186 A1* | 3/2012 | Yi | .......................... | G06F 3/044 345/173 |
| 2013/0265274 A1 | 10/2013 | Liu et al. | | |
| 2014/0204048 A1* | 7/2014 | Lai | ......................... | G06F 3/044 345/174 |
| 2015/0034472 A1* | 2/2015 | Li | .......................... | G06F 3/044 200/5 R |

FOREIGN PATENT DOCUMENTS

| | | |
|---|---|---|
| JP | 2011-048780 A | 3/2011 |
| JP | 4720857 B2 | 7/2011 |
| JP | 2011221114 A | 11/2011 |
| JP | 3182342 U | 3/2013 |
| JP | 2014016857 A | 1/2014 |

OTHER PUBLICATIONS

Communication dated Dec. 19, 2017, from Japanese Patent Office in counterpart application No. 2014-028423.

* cited by examiner

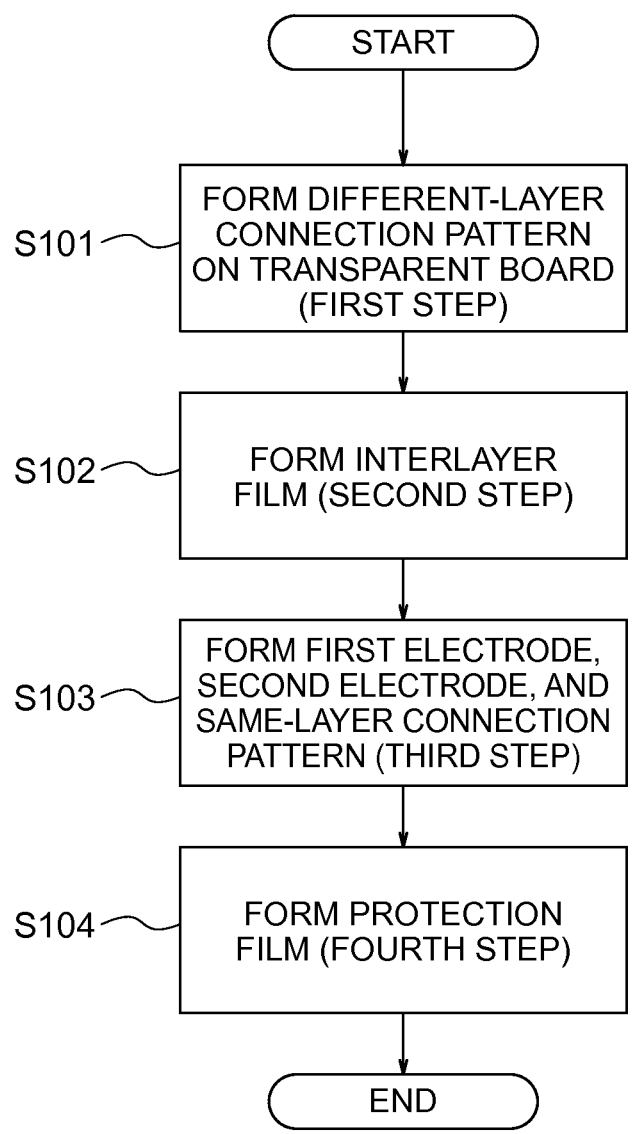

TOUCH SENSOR BOARD, IMAGE DISPLAY DEVICE, AND TOUCH SENSOR BOARD MANUFACTURING METHOD

CROSS-REFERENCE TO RELATED APPLICATION

This application is based upon and claims the benefit of priority from Japanese patent application No. 2014-028423, filed on Feb. 18, 2014, the disclosure of which is incorporated herein in its entirety by reference.

BACKGROUND OF THE INVENTION

1. Field of the Invention

The present invention relates to a touch sensor board, an image display device, and a manufacturing method of the touch sensor board. More specifically, the present invention relates to a touch sensor board and the like with which high screen visibility can be achieved and manufacture failure does not occur so easily.

2. Description of the Related Art

Recently, electronic apparatuses such as smartphones, tablets, and notebook personal computers provided with a touch panel formed by combining a liquid crystal display with a touch sensor board as an input/output module have become common. With such touch panel, input operations can be done by touching the display screen directly with a finger (or a touch pen, or the like). Therefore, it is possible to achieve a user interface that can be operated by a user intuitively and conveniently.

Among the touch sensor boards, particularly a projected capacitive type (referred to as a PCAP type hereinafter) is used most frequently for such touch panels. This is a type which detects changes in the static capacitance of a part touched by the user with sensor electrodes extendedly provided in the longitudinal and lateral directions on the touch sensor board. The touch sensor board is formed with a plurality of sensor electrodes constituted with first electrodes and second electrodes being insulated electrically and an interlayer film provided for achieving interlayer isolation (insulation) at least at the intersections between the first electrodes and the second electrodes.

With this system, it is possible to detect the position of a finger when the finger simply approaches a sensor electrode even though the finger does not touch the sensor electrode directly. This makes it possible to place a cover such as glass on the surface of a touch panel, so that this system is excellent in terms of durability, environment resistance, design, and the like. Further, this system also is high in detection accuracy of the positions at which the finger touches, and a greater number of points can be detected. Therefore, it is possible to perform complicated input operations such as slide input, flick input, gesture input, and the like with smartphones, thereby making it possible to greatly contribute to improving the operability.

On the other hand, the touch sensor board is required to form the sensor electrodes and the interlayer film with a colorless transparent material so that the visibility of the liquid crystal display is not obstructed. It is common to use ITO (indium tin oxide) as the material for the sensor electrodes and to use an acryl resin or a polyimide resin as the material for the interlayer film. However, none of those is completely colorless and transparent.

Thus, deterioration in the visibility of the display screen caused due to the optical characteristic of the sensor electrodes and the interlayer film is generated. In order to improve that point, many technical experiments have been tried since. Hereinafter, the notable experiments among those will be described.

Basically, as the structure of a touch sensor board, there are a case where the above-described first electrodes and second electrodes are formed separately and a case where those are formed with a same single layer. Out of those cases, the sensor electrodes are formed with separate layers by sandwiching an interlayer insulating film therebetween with the structure where the electrodes are formed with two layers. Thus, the optical path length for the reflection light varies between the first electrodes and the second electrodes, which causes difference in the optical characteristics so that the visibility is deteriorated.

Japanese Unexamined Patent Publication 2009-265748 (Patent Document 1) discloses a technique which forms the first electrode and the second electrode of the sensor electrodes with a same single layer. By forming the first electrode and the second electrode with the same single layer, the optical characteristics becomes identical at least in the areas where the sensor electrodes exist, so that the deterioration of the visibility can be suppressed.

Japanese Unexamined Patent Publication 2010-140370 (Patent Document 2) and JP 4720857 B (Patent Document 3) disclose a technique which forms a minimum necessary interlayer film pattern only in the intersections between connection patterns connected electrically to the first electrodes and the second electrodes, respectively, so as to suppress deterioration of the transmittance thereby. With a structure where the interlayer film exists on the entire surface, the transmittance is deteriorated in no small quantities due to the existence of the interlayer film. Especially in a case where the interlayer film is formed in film thickness of an organic resin or the like for decreasing the coupling capacitance between the first electrode and the second electrode, the transmittance is deteriorated more prominently. Therefore, it is possible to suppress deterioration in the transmittance through forming the interlayer film only in the intersections.

Patent Document 3 further discloses a structure which forms a dummy pattern having a refractive index equivalent to that of an electrode pattern in the area with no electrode pattern, i.e., in a part of the gap between the neighboring electrode patterns, so as to suppress deterioration in the visibility caused due to the difference between the optical characteristics of the section having the sensor electrode and the section with no sensor electrode in order to improve the visibility.

However, it is necessary with this technique to secure the space for both the dummy pattern and the electrode pattern when the dummy pattern is formed simultaneously with the electrode pattern, so that the section with no electrode pattern cannot be eliminated completely. Thus, the effect of improving the visibility is small. Therefore, in Patent Document 3, it is also disclosed to form the dummy pattern with a different material from that of the electrode pattern.

The techniques depicted in each of Patent Documents 1 to 3 described above are named as existing techniques 1 to 3, respectively, and those will be described in the following paragraphs.

(Regarding Existing Technique 1)

FIG. 16 is a plan view showing the structure of a touch sensor board 910 (according to Existing Technique 1) depicted in Patent Document 1. The touch sensor board 910 is of a PCAP type, in which first electrodes 911 and second electrodes 912 as the sensor electrodes are formed on a transparent board 916 to be neighboring to each other on a same plane with a same single layer. The first electrodes 911 are extended by being electrically connected via same-layer connection patterns 913, while the second electrodes 912 are extended in a different direction from that of the first electrodes by being electrically connected via different-layer connection patterns 914 disposed on a different layer from the second electrodes 912.

Note here that the same-layer connection pattern 913 and the different-layer connection pattern 914 are formed to be electrically interlayer-insulated via an interlayer film 915. At the same time, the interlayer film 915 is formed to become an isolated pattern by including the intersection area described above and to have no overlapping part with the second electrodes 912.

FIG. 17 is a sectional view taken along a line H-H' of FIG. 16. The touch sensor board 910 is fabricated via each of steps in which: the different-layer connection patterns 914 are first formed on the transparent board 916 and the interlayer film 915 is formed successively in this order; the first electrodes 911, the second electrodes 912, and the same-layer connection patterns 913 are formed on a same layer (this layer is called a sensor electrode layer); and a protection layer 917 is formed on the sensor electrode layer at last.

With this structure, an exposed region 918 that does not overlap with either the pattern of the sensor electrode layer or the pattern of the interlayer film 915 exists. The exposed region 918 is exposed at the time of etching processing performed when forming the pattern of the sensor electrode layer. Thus, as a film material for the sensor electrode layer and a film material for the different-layer connection patterns 914, it is required to select materials that are selective for the etching processing of the sensor electrode layer. That is, the film materials are limited, so that it is not possible to select the optimum film materials by considering the transmittance of light, electric resistance, and the like.

(Regarding Existing Technique 2)

As a technique for overcoming the above-described issue of Existing Technique 1, there is Existing Technique 2. FIG. 18 is a plan view showing the structure of a touch sensor board 920 (according to Existing Technique 2) depicted in Patent Document 2.

The touch sensor board 920 is of a PCAP type, in which first electrodes 921 and second electrodes 922 as the sensor electrodes are formed on a transparent board 926 to be neighboring to each other on a same plane with a same single layer. The first electrodes 921 are extended by being electrically connected via same-layer connection patterns 923 disposed on a same layer as the first electrodes 921, while the second electrodes 922 are extended in a different direction from that of the first electrodes by being electrically connected via different-layer connection patterns 924 disposed on a different layer from the second electrodes 922.

Note here that the section where the same-layer connection pattern 923 and the different-layer connection pattern 924 intersect with each other is formed to intersect by being electrically inter-layer insulated via an interlayer film 925. The interlayer film 925 is formed limitedly in the intersections between the same-layer connection patterns 923 and the different-layer connection patterns 924, and a part thereof is formed to overlap with the second electrodes 922.

Therefore, the different-layer connection pattern 924 necessarily overlaps with the pattern of the sensor electrode layer or the interlayer film 925, so that there is no exposed part generated at the time of the etching processing like the exposed region 918 shown in FIGS. 16 and 17. Thus, it becomes unnecessary to select the film material exhibiting selectivity for the etching processing, so that the optimum film materials can be selected.

That is, the issue of Existing Technique 1 described above can be overcome. However, there is another issue generated thereby. This point will be described.

FIG. 19 is a perspective view showing an enlarged view of an end vicinity region 923*a* of the same-layer connection pattern 923 of the touch sensor board 920 shown in FIG. 18. As in the case of Existing Technique 1, manufacturing steps of the touch sensor board 920 are as follows. That is, the different-layer connection patterns 924 are first formed on the transparent board 926 and then the interlayer film 925 is formed successively in this order; and the sensor electrode layer is formed thereafter.

Note here that the first electrodes 921, the second electrodes 922, and the same-layer connection patterns 923 as the sensor electrode layer are formed after the interlayer film 925 is formed to be an isolated pattern. Regarding the same-layer connection patterns 923 and the different-layer connection patterns 924, it is necessary to set the constant at the time of wiring the extended sensor electrodes through minimizing the parasitic capacitance formed between those connection patterns. Thus, the interlayer film 925 is formed in relatively thick film thickness.

Due to steps generated by the film thickness, there is a remaining film 928 of the sensor electrode material generated along the end part of the interlayer film 925. This causes an issue of having short-circuit generated between the neighboring first electrodes 921 and second electrodes 922.

In the manufacturing steps, the sensor electrode material is deposited on the board where deposition of the interlayer film 925 has been completed, and a photoresist for forming the patterns of the first electrodes 921 and the second electrodes 922 is applied. At that time, the photoresist is applied thicker in the vicinity of the large step of the interlayer film 925 than in the other areas, thereby deteriorating the exposure and development etching characteristic. As a result, the remaining film of the photoresist is generated along the end part of the interlayer film 925. This remaining film is the cause for generating the remaining film 928 of the sensor electrode material, which forms the short-circuit path between the neighboring sensor electrode patterns.

(Regarding Existing Technique 3)

As a technique for overcoming the above-described issue of Existing Technique 2, there is Existing Technique 3. FIG. 20 is a plan view showing the structure of the touch sensor board 930 (according to Existing Technique 3) depicted in Patent Document 3.

The touch sensor board 930 is of a PCAP type, in which first electrodes 931 and second electrodes 932 as the sensor electrodes are formed on a transparent board 936 to be neighboring to each other on a same plane with a same single layer. The first electrodes 931 are extended by being electrically connected via same-layer connection patterns 933 disposed on a same layer as the first electrodes 931, while the second electrodes 932 are extended in a different direction from that of the first electrode by being electrically connected via different-layer connection patterns 934 disposed on a different layer from the second electrodes 932.

Note here that the same-layer connection patterns 933 and the different-layer connection patterns 934 are formed to be electrically interlayer-insulated via an interlayer film 935. At the same time, the interlayer film 935 is not formed to be an isolated pattern but formed almost over the whole surface on the touch sensor board 930 except for through holes 935*a* opened in the connection parts between the second electrodes 932 and the different-layer connection patterns 934.

Thus, the different-layer connection patterns 934 overlap with either the pattern of the sensor electrode layer or the interlayer film 935, so that there is no exposed part generated at the time of performing the etching processing like the exposed region 918 shown in FIGS. 16 and 17. Therefore, the issue of Existing Technique 1 does not occur. Further, Existing Technique 3 has no pattern end that may possibly form the short-circuit path between the neighboring sensor electrode patterns as in Existing Technique 2. Therefore, the issue of Existing Technique 2 does not occur.

However, Existing Technique 3 faces another issue generated because the interlayer film 935 is formed almost over the entire surface. This issue may possibly occur with the structures where the interlayer film is formed only in the intersections between the sensor electrodes as in Existing Techniques 1 and 2, i.e., with the structure where the interlayer film is not formed almost on the entire surface. This will be described.

FIG. 21 is a sectional view taken along a line I-I' of FIG. 18 (Existing Technique 2). On the touch sensor board 920 according to Existing Technique 2, the interlayer film 925 is formed only in the intersections between the same-layer connection patterns 923 and the different-layer connection patterns 924. Thus, as the paths where the light of screen display transmits through, there are two kinds of paths such as a path 3A "the transparent board 926→the first electrode 921 or the second electrode 922→the protection film 927" and a path 3B "the transparent board 926→the protection film 927".

There is a difference generated in the transmittance as the entire touch sensor board 920 between the path 3A that passes through the sensor electrodes and the path 3B that does not pass through the sensor electrodes for the amount of the transmittance of the sensor electrodes (the first electrodes 921 or the second electrodes 922). Note here that the number of films the light has to passes through is different for the paths 3A and 3B. That is, the number of film interfaces is different, so that it is difficult to control the reflectance. This causes difference in the reflection characteristics between those paths.

The difference in the reflection characteristics provides a state where the user can recognize the electrode patterns visually at least with a specific display luminance and a specific viewing angle. This causes the critical deterioration in the display quality.

FIG. 22 is a sectional view taken along a line J-J' of FIG. 20 (Existing Technique 3). In the touch sensor board 930 according to Existing Technique 3, as the paths where the light of screen display transmits through, there are two kinds of paths such as a path 4A "the transparent board 936→the interlayer film 935→the first electrode 931 or the second electrode 932→the protection film 937" and a path 4B "the transparent board 936→the interlayer film 935→the protection film 937".

That is, in the case of the touch sensor board 930 according to Existing Technique 3, the film interfaces are to increase for the amount of the transmittance of the interlayer film 935 formed almost on the entire surface. Thus, compared to the case of Existing Technique 2, control of the reflectance becomes more difficult. In Patent Document 3, it is also depicted as a countermeasure for such issue to "form a dummy pattern as another layer with a material different from that of the electrode patterns". However, this evidently complicates the manufacturing steps and causes a great increase in the cost, so that it is not practical.
(Summary of Issues Regarding Existing Techniques)

As the summary of the above, the issues regarding the PCAP-type touch sensor board in Existing Techniques are three points in the followings.
(Issue 1)
Due to the existence of the exposed region 918 exposed at the time of the etching processing performed when forming the patterns of the sensor electrode layer, selection of the optimum film material becomes difficult. Accordingly, the manufacture readiness is deteriorated and the cost is increased (Existing Technique 1).
(Issue 2)
The remaining film of the photoresist tends to be generated in the isolated interlayer film end part. This causes short-circuit failure between the sensor electrodes, thereby deteriorating the manufacture yield (Existing Technique 2).
(Issue 3)
There is a difference generated in the transmittance as the entire touch sensor board between the path that passes through the sensor electrodes and the path that does not pass through the sensor electrodes for the amount of the transmittance of the sensor electrodes, so that control of the optical characteristic becomes difficult. Therefore, it is likely to deteriorate the display quality, e.g., the user can recognize the electrode patterns visually (Existing Techniques 1, 2, 3).

As described above, with Existing Techniques 1 to 3, the structure for overcoming one issue may be the factor for causing another issue such as the cases of Issue 1 and Issue 2 regarding the structure of the interlayer film. Further, as in the case of Issue 3, another intrinsic issue stands as the issue that cannot be overcome.

It is therefore an exemplary object of the present invention to overcome Issues 1 to 3 described above simultaneously and to provide the touch sensor board, the image display device, and the manufacturing method of the touch sensor board capable of improving the visibility of the screen and the manufacture yield (manufacture cost) simultaneously.

SUMMARY OF THE INVENTION

In order to achieve the foregoing object, the touch sensor board according to an exemplary aspect of the invention is a static capacitive type touch sensor board formed on a transparent board, which includes: a plurality of mutually parallel first electrodes extendedly provided by connecting polygonal electrode elements on a same layer of the transparent board along a first direction via connection patterns; and a plurality of mutually parallel second electrodes extendedly provided by connecting polygonal electrode elements on the same layer as that of the first electrodes along a second direction via connection patterns, wherein: regarding the electrode elements of the first and second electrodes, each of the electrode elements that are electrically equivalent is connected via a same-layer connection pattern or a different-layer connection pattern, and the same-layer connection pattern and the different-layer connection pattern overlap with each other via an interlayer film that is formed by an insulator; and the interlayer film is continued from a part where the same-layer connection pattern and the different-layer connection pattern overlap with each other via a gap part between each of the electrode elements, the interlayer film is formed to be continued in the gap part, and the interlayer film is not formed practically in a region where the first and second electrodes are formed.

In order to achieve the foregoing object, the image display device according to another exemplary aspect of the invention is an image display device which includes, on a front face of a display panel for displaying image information, a touch sensor board capable of performing an input operation corresponding to a content displayed on the display panel, wherein the touch sensor board is the touch sensor board of any one of the exemplary embodiments.

In order to achieve the foregoing object, the touch sensor substrate manufacturing method according to still another exemplary aspect of the invention is a manufacturing method of a static capacitive type touch sensor board, and the method includes: a step of forming first connection patterns by a conductive material on the board; a step of forming an interlayer film by an insulator on the first connection patterns; a step of forming polygonal electrode elements and second connection patterns on the interlayer film, taking a part of the electrode elements as a plurality of mutually parallel first electrodes extendedly provided by being connected via the first connection patterns along a first direction, and taking remainder of the electrode elements as a plurality of mutually parallel second electrodes extendedly provided by being connected via the second connection patterns along a second direction while being insulated from the first electrodes by the interlayer film, wherein the interlayer film is continued from a part where the same-layer connection pattern and the different-layer connection pattern overlap with each other via a gap part between each of the electrode elements, and the interlayer film is formed to be continued in the gap part.

In order to achieve the foregoing object, another touch sensor substrate manufacturing method according to still another exemplary aspect of the invention is a manufacturing method of a static capacitive type touch sensor board, and the method includes: a step of forming polygonal electrode elements and first connection patterns on the board, and taking a part of the electrode elements as a plurality of mutually parallel first electrodes extendedly provided by being connected via the first connection patterns along a first direction; a step of forming an interlayer film by an insulator on the first electrodes; a step of forming second connection patterns on the interlayer film, and taking remainder of the electrode elements as a plurality of mutually parallel second electrodes extendedly provided by being connected via the second connection patterns along a second direction while being insulated from the first electrodes by the interlayer film, wherein the interlayer film is continued from a part where the same-layer connection pattern and the different-layer connection pattern overlap with each other via a gap part between each of the electrode elements, and the interlayer film is formed to be continued in the gap part.

BRIEF DESCRIPTION OF THE DRAWINGS

FIG. 3 is a flowchart showing a manufacturing method of the touch sensor board shown in FIGS. 1 and 2A-2B;

DETAILED DESCRIPTION OF THE PREFERRED EMBODIMENTS

First Exemplary Embodiment

Figure 1:
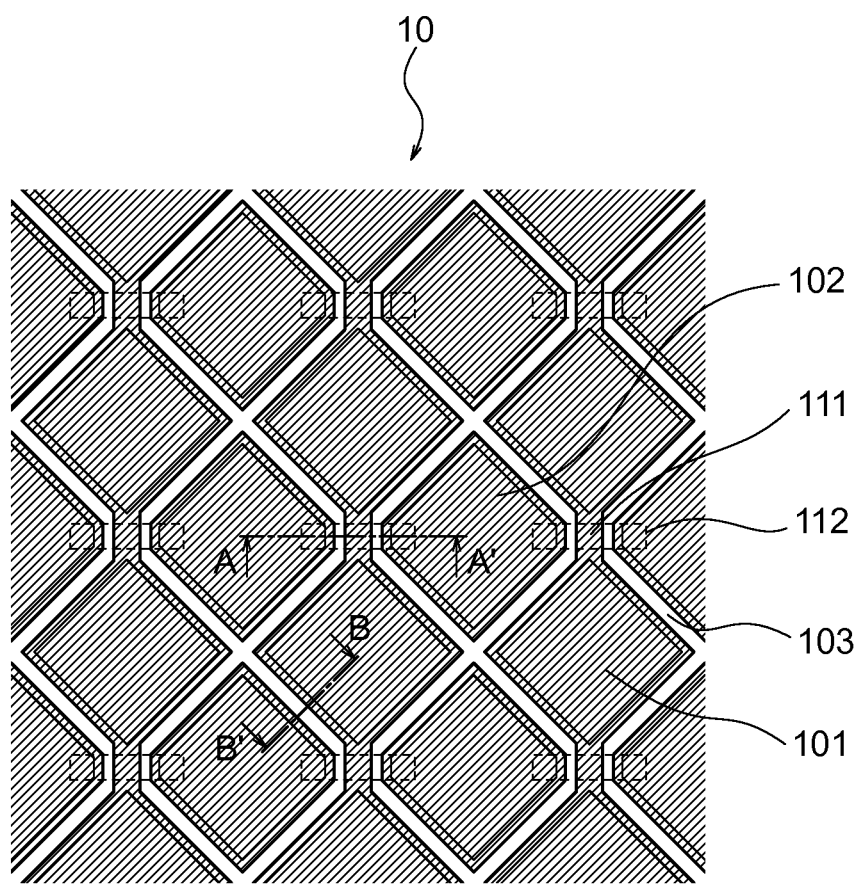
FIG. 1 is a plan view showing a touch sensor board according to a first exemplary embodiment of the present invention.

Hereinafter, the structure of a first exemplary embodiment according to the present invention will be described by referring to an accompanying drawing FIG. 1.

A touch sensor board 10 according to the first exemplary embodiment is a static capacitive type touch sensor board formed on a board. The touch sensor board 10 includes: a plurality of mutually parallel first electrodes 101 extendedly provided by connecting polygonal electrode elements on a same layer of a transparent board along a first direction via connection patterns; and a plurality of mutually parallel second electrodes 102 extendedly provided by connecting polygonal electrode elements on a same layer as that of the first electrodes along a second direction via connection patterns. Regarding the first and second electrodes, one of those is connected to each electrode element via same-layer connection patterns 111 while the other is connected to each electrode element via different-layer connection patterns 112. The same-layer connection pattern and the different-layer connection pattern overlap on one another via an interlayer film 103 that is formed by an insulator. Further, the interlayer film 103 is continued from the overlapping part between the same-layer connection pattern and the different-layer connection pattern via a gap part between each of the electrode elements, and the interlayer film is formed to be continued in the gap part.

Note here that the interlayer film 103 may be structured in a form either in an overlapping state or a state having a space between with the first electrode pattern or the second electrode pattern or may be structured in a formed having an overlapping region between with all the electrode elements and filled in the entire gap part between the neighboring electrode elements. Further, the interlayer film 103 may also be structured in a form to section all the first electrodes and second electrodes and to continue by surrounding the first and second electrodes.

Furthermore, the interlayer film, the same-layer connection patterns, and either pattern of the first electrodes or the second electrodes may be formed in a shape to cover the different-layer connection patterns. Further, the interlayer film may be formed to overlap with either the first electrodes or the second electrodes. Furthermore, the different-layer connection patterns can be formed with a transparent conductive material.

Through having the above-described structure, the touch sensor board 10 becomes capable of improving the visibility of the screen and the manufacture yield at the same time. Hereinafter, this will be described in more details.

Hereinafter, in order to secure the visibility, the size and reduced scale of each of the structural elements are changed as appropriate in each of the drawings described for each of the exemplary embodiments of the present invention. Further, while there are some cases where hatching is applied in each drawing for making it easier to discriminate each of the structural elements, it does not necessarily indicate a section.

Figure 2A:
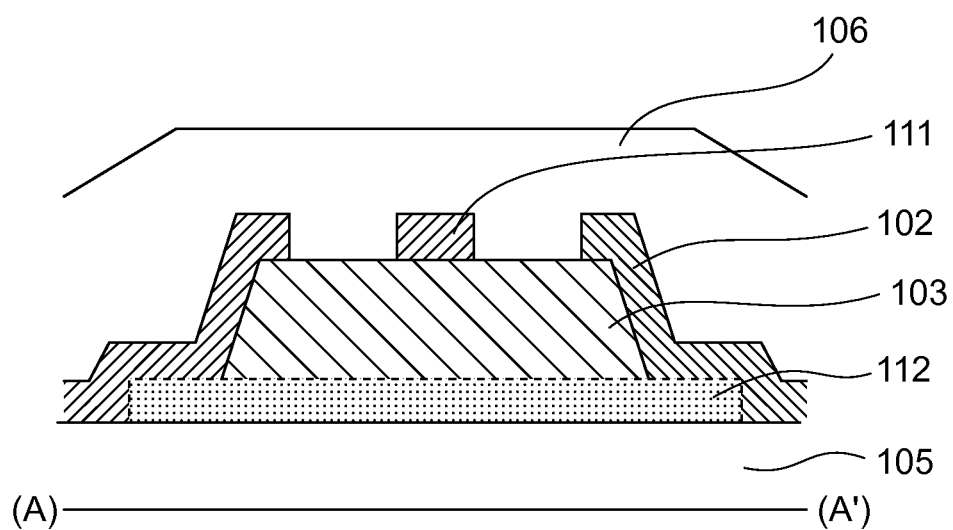
FIG. 2A is a sectional view taken along a line A-A' of FIG. 1.
Figure 2B:
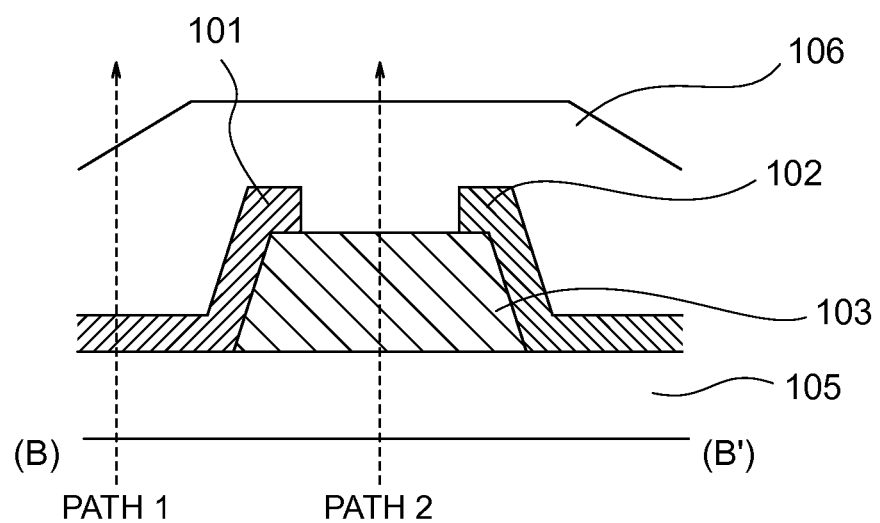
FIG. 2B is a sectional view taken along a line B-B' of FIG. 1.

FIG. 1 is a plan view showing the touch sensor board 10 according to the first exemplary embodiment of the present invention. FIG. 2A is a sectional view taken along a line A-A' of FIG. 1, and FIG. 2B is a sectional view taken along a line B-B' of FIG. 1. In the touch sensor board 10, the first sensor electrodes 101 and the second sensor electrodes 102 as the sensor electrodes are formed to be neighboring to each other with a space provided therebetween on a same plane with a same single layer on the transparent board 105.

FIG. 1 shows an example where the electrode elements of the first electrode 101 and the second electrode 102 are both in a rhombic shape. However, the shape thereof may be any other shapes as long as those electrodes can be placed and filled on a plane. Further, the interlayer film 103 for insulation is formed between the first electrodes 101 and the second electrodes 102.

The space between the first electrode 101 and the second electrode 102 may simply be designed in a size with which short-circuit failure by having a foreign matter caught in the manufacturing steps of a normal TFT array production line is not likely to occur. That is, high-yield production can be achieved through designing the space to be about 20 μm or more. Therefore, it is possible to reduce the board inspection frequency, so that low cost and high throughput can be achieved.

Further, the two kinds of connection patterns such as the same-layer connection pattern 111 and the different-layer connection pattern 112 are electrically connected to each of the electrode elements (in a rhombic shape or the like) such that the each of the elements of the first electrodes 101 and the second electrodes 102 is extended in different directions from each other. The elements of the first electrodes 101 neighboring to each other are electrically connected via the same-connection patterns 111 formed on a same layer, while the elements of the second electrodes 102 neighboring to each other are electrically connected via the different-connection patterns 112 formed on a different layer.

The same-layer connection pattern 111 and the different-layer connection pattern 112 intersect with each other by being electrically insulated by the interlayer film 103. The interlayer film 103 is formed by an insulation material and formed to be extended to the intersections between the same-layer connection patterns 111 and the different-layer connection patterns 112 connected, respectively, to the first electrodes 101 and the second electrodes 102 and also to the space part between the sensor electrode patterns formed neighboring to each other by being insulated electrically.

Note here that "the space part between the sensor electrodes" means the region excluding the region including the intersection area between the same-layer connection pattern 111 and the different-layer connection pattern 112 from the region where the sensor electrode is not formed, and mainly means the space area where the pattern ends of the sensor electrodes (the first electrode 101 and the second electrode 102) are formed to be almost parallel.

Further, while the interlayer film 103 is formed not to overlap with the patterns of the sensor electrodes (the first electrode 101 and the second electrode 102), it is not actually formed in the region where the patterns of the sensor electrodes are formed. That is, the sensor electrode patterns and the interlayer film pattern are formed in an overlapping manner at least for the amount necessary for avoiding simultaneous existence of the structure in which the patterns overlap with each other and the structure in which there is a space between the patterns caused due to manufacture errors such as discrepancy generated in overlapping when forming the patterns and thickening/narrowing in the line width.

Further, the different-layer connection patterns 112 are formed by a conductive material. Particularly, when the different-layer connection patterns 112 are formed first on the transparent board 105, it is desired to form the different-layer connection patterns 112 by being completely covered by the combined region of the interlayer film 103, the same-layer connection patterns 111, and the second electrodes 102 connected via the different-layer connection patterns 112.

In this exemplary embodiment, the touch sensor board 10 is formed through executing a first step where the different-layer connection patterns 112 are formed, a second step where the interlayer film 103 is formed, and a third step where photo-etching processing (PEP) is performed on the sensor electrodes (the first electrodes 101 and the second electrodes 102) and the same-layer connection patterns 111. Thus, the different-layer connection patterns 112 formed in the first step are not likely to be eliminated by the etching processing executed in the third step.

First Exemplary Embodiment: Manufacturing Steps

FIG. 3 is a flowchart showing the manufacturing method of the touch sensor board 10 shown in FIG. 1 and FIGS.

2A-2B. First, the different-layer connection patterns 112 are formed on the transparent board 105 (step S101: the first step). The transparent board 105 is a colorless transparent material such as glass or plastic. A material metal is deposited thereon to form a pattern by PEP to include the position that intersects with the same-layer connection patterns 111.

Note here that there is no specific limit set for the metals to be used as the material for the different-layer connection patterns 112. However, in order to decrease the deterioration in the visibility of the screen display caused due to glare on the screen and decrease in the transmittance of the touch sensor board, it is desirable to use a transparent conductive material such as ITO.

Further, naturally, the different-layer connection pattern 112 is for electrically bridge-connecting the electrode patterns formed on different layers. Thus, it may be formed in a stacking structure for acquiring a fine connection property with the target patterns to be bridge-connected. An example thereof is a structure in which the different-layer connection pattern is formed with stacking layers of a molybdenum alloy and an aluminum alloy for using the molybdenum alloy as the metal for being connected to the sensor electrode.

Subsequently, the interlayer film 103 is formed on the different-layer connection pattern 112 formed on the transparent board 105 (step S102: the second step). An insulating material to be an insulating film is deposited or applied on the different-layer connection pattern 112 formed on the transparent board 105 to form the interlayer film 103 by forming a pattern by PEP to include the position where the same-layer connection pattern 111 and the different-layer connection pattern 112 are to intersect with each other, to expose the different-connection pattern 112 in the part connected to the second electrode 102, and to include the space part between the neighboring first electrode 101 and second electrode 102.

Note here that the interlayer film 103 is desirable to be formed thick with a material of low permittivity in order to reduce the parasitic capacitance formed in the intersections between the same-layer connection patterns 111 and the different-layer connection patterns 112 as much as possible. Further, it is also desirable to be a material which exhibits high transmittivity for suppressing decrease in the transmittance of the sensor board and is selected by considering readiness for performing thick-film processing. For example, an organic interlayer film such as an acryl resin or a polyimide resin, and the film thickness therefore is set as 1 to 3 μm.

Subsequently, the first electrodes 101 and the second electrodes 102 as the sensor electrode patterns as well as the same-layer connection pattern 111 are formed on the different-layer connection pattern 112 and the interlayer film 103 formed on the transparent board 105 (step S103: the third step). A conductive material to be the sensor electrodes is deposited or applied on the interlayer film 103, and those patterns are formed by PEP.

The neighboring first electrode 101 and second electrode 102 are electrically insulated by providing a space therebetween, and the sensor electrode pattern is formed to overlap with the pattern of the interlayer film 103. The overlapping amount between the sensor electrode pattern and the interlayer film 103 at least secures the size that makes it possible to avoid generation of an overlapping state or a gap between the sensor electrode pattern and the interlayer film 103 caused due to manufacture tolerance.

Further, the sensor electrode patterns are desired to be formed with a film of low resistance and high transmittance, so that those are formed with a conductive material such as ITO which exhibits transmittivity in a visible light wavelength region. In order to equalize the transmittivity within the touch sensor board, the sensor electrode patterns are desired to be formed in the film thickness with which the film transmittance of the sensor electrode patterns and that of the interlayer film pattern can be equivalent in the visible light wavelength region of 400 to 700 nm.

For example, through forming the first electrode 101 and the second electrode 102 with ITO of about 20 nm in film thickness and forming the interlayer film 103 with an acryl resin film of 2 μm in film thickness, the difference in the transmittance of each of the wavelengths 400 to 700 nm can be made as about 1%. However, considering the errors and the like generated in the manufacturing steps, it is practical to form those in film thicknesses with which the difference in the transmittance falls within a range of about several %.

In a case where low resistance of the sensor electrode material is required due to the increased size and the like of the touch sensor board, the ITO film may be formed thick and the film thickness of the acryl resin film may be formed in such a manner that the transmittance thereof becomes equivalent to that of the ITO film.

Further, in order to make the reflection characteristic within the touch sensor board close to uniform, it is desirable to equalize the refractive index of the sensor electrode patterns and as that of the interlayer film 103. For example, the interlayer film 103 is formed with a polyimide resin (refractive index of up to 1.7). In a case where the transparent board 105 is typical glass (OA-10, a product of Nippon Electric Glass Co., Ltd.; refractive index of 1.47) used in LCD and the sensor electrode material is ITO (refractive index of up to 2.0), deviation with respect to the refractive index of the sensor electrodes becomes small and the difference in the reflection characteristic can be made small through forming the interlayer film 103 made with a polyimide resin in the region where there is no sensor electrode pattern.

At last, the protection film 106 is formed on the formed first electrodes 101, second electrodes 102, and same-layer connection patterns 111 (step S104: the fourth step). The protection film 106 is formed with PEP to cover at least the region where the sensor electrodes are formed, and it may be formed with a material that is transparent and electrically insulates the layers. Specifically, it is an inorganic film such as a silicon nitride film or a silicon oxide film or an organic film such as an acryl resin film, etc. Alternatively, a transparent board such as a cover glass may be disposed via an adhesive exhibiting an insulating characteristic to substitute the protection film 106. Further, the protection film 106 and the cover glass or the like may both be used.

First Exemplary Embodiment: Effects

In the touch sensor board 10 according to the first exemplary embodiment described above, the end part of the interlayer film 103 is formed in the space part of the neighboring first electrodes 101 or the second electrodes 102. Thus, it does not cross over the part between the neighboring first electrodes 101 and second electrodes 102. Therefore, it is possible to greatly reduce generation of short-circuit failure along the end part of the interlayer film 103. Further, through narrowing the space between the patterns of the sensor electrodes, it is also possible to improve the visibility of the display screen.

In FIG. 2B described above, a path 1 "the transparent board 105→the first electrode 101 or the second electrode 102→the protection film 106" and a path 2 "the transparent board 105→the interlayer film 103→the protection film 106" are shown as the paths through which the light for screen display transmits on the touch sensor board 10.

In both paths, "the first electrode 101 or the second electrode 102" or "the interlayer film 103" as the light-transmitting substance is interposed between the transparent board 105 and the protection film 106. That is, it is simply required to consider the refractive index and the film thickness of the material used between "the first electrode 101 and the second electrode 102" and "the interlayer film 103", so that it becomes easy to control the reflectance and the transmittance. For the electrodes, it is necessary to determine the optimum film thickness by considering both the conductivity and the optical characteristic. However, for the interlayer film, the film thickness can be determined by considering only the optical characteristic. Thus, as will be described in the followings, it becomes still easier to control the optical characteristic.

Figure 4:
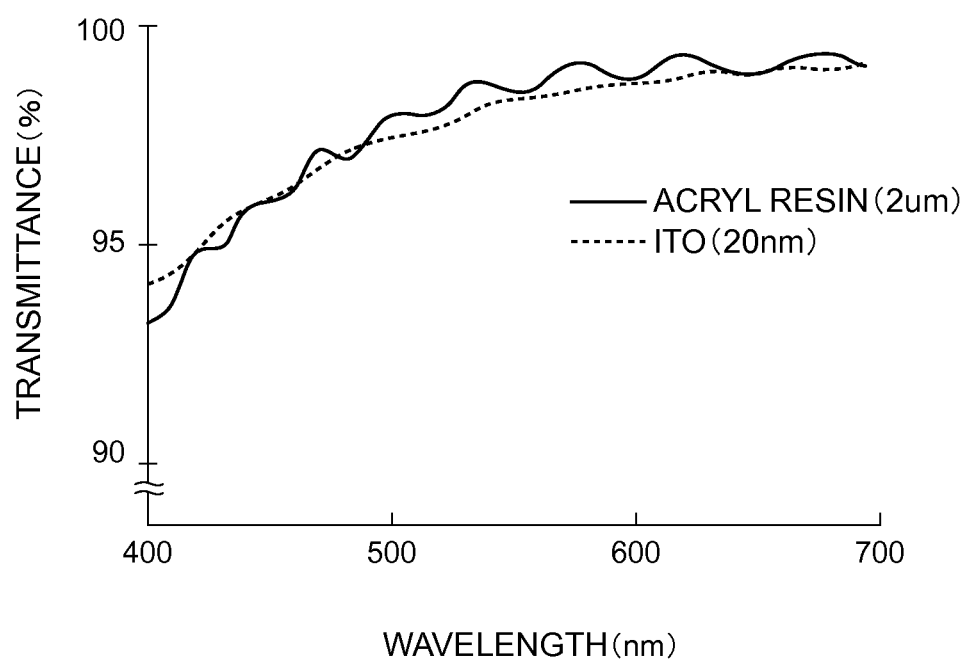
FIG. 4 is a graph showing the wavelength dependency of the transmittance of ITO that is a typical base material of a first electrode and a second electrode and an acryl resin that is a typical base material of an interlayer film on the touch sensor board shown in FIGS. 1 and 2A-2B.

FIG. 4 is a graph showing the wavelength dependency of the transmittance of ITO that is a typical base material of the first electrodes 101 and the second electrodes 102 and an acryl resin that is a typical base material of the interlayer film 103 on the touch sensor board 10 shown in FIGS. 1 and 2A-2B.

The ITO film and the acryl resin film both exhibit such characteristic that the transmittance decreases on the short wavelength side. Therefore, assuming that the film thickness of the ITO film is about 20 nm, the film transmittance can be equivalent by forming the film thickness of the acryl resin film to be about 2 µm. As described, through making the transmittance equivalent for "the first electrode 101 and the second electrode 102" and "the interlayer film 103" interposed between the transparent board 105 and the protection film 106, the transmission characteristic of the visible light can be made equivalent for the first and second paths. This makes it possible to suppress deterioration in the visibility of the display screen caused due to the difference in the transmittance within the screen.

Now, the structures of the existing technique where the interlayer film pattern is disposed only in the intersections between the sensor electrodes as in Existing Techniques 2 and 3 described above are compared to the touch sensor board 10 of the exemplary embodiment. Compared to structures of Existing Techniques 2 and 3, the occupying area of the interlayer film 103 is greater in the structure of the touch sensor board 10.

With Existing Techniques, the interlayer film is formed on the in the intersections of the sensor electrodes for minimizing the decrease in the transmittance of the touch sensor board caused due to the existence of the interlayer film. Compared to such case, the occupying area of the interlayer film 103 is greater in the touch sensor board 10 of the exemplary embodiment. Therefore, the transmittance of the touch sensor board is decreased necessarily.

However, in the exemplary embodiment, the sensor electrode pattern region occupies most of the transmission region, and the interlayer film 103 is disposed in the part having no sensor electrode pattern, i.e., in the part with a small occupying area. Thus, decrease in the board transmittance caused thereby is very small.

For example, in a case where the size of a single sensor element is 5 mm×5 mm and the space between the electrodes is 0.050 mm, the increase rate in the occupying area of the interlayer film pattern is about 2.5%. Assuming that the film transmittance of the interlayer film pattern is 90%, it is calculated to be about 0.25% decrease as the transmittance of the touch sensor board. This is a level equivalent to that of manufacture variation generated in the manufacturing steps of a typical touch sensor board. Thus, decrease in the transmittance of the board according to the exemplary embodiment is not in a level to raise a specific issue, so that the visibility of the display screen can be improved without influencing the transmittance of the board.

As an exemplary advantage according to the invention, the present invention is designed to have the structure in which the interlayer film is not formed practically in the regions where the first and second electrodes are formed. Therefore, the electrically short-circuit path generated due to the remaining film of the photoresist in the interlayer film end part is not easily formed, and the control of the optical characteristic according to the material and thickness of the interlayer film can be done easily.

This makes it possible to overcome Issues 1 to 3 described above simultaneously and to provide the touch sensor board, the image display device, and the manufacturing method of the touch sensor board, which are excellent in improving the visibility of the screen and the manufacture yield (manufacture cost) simultaneously.

Second Exemplary Embodiment

Figure 5:
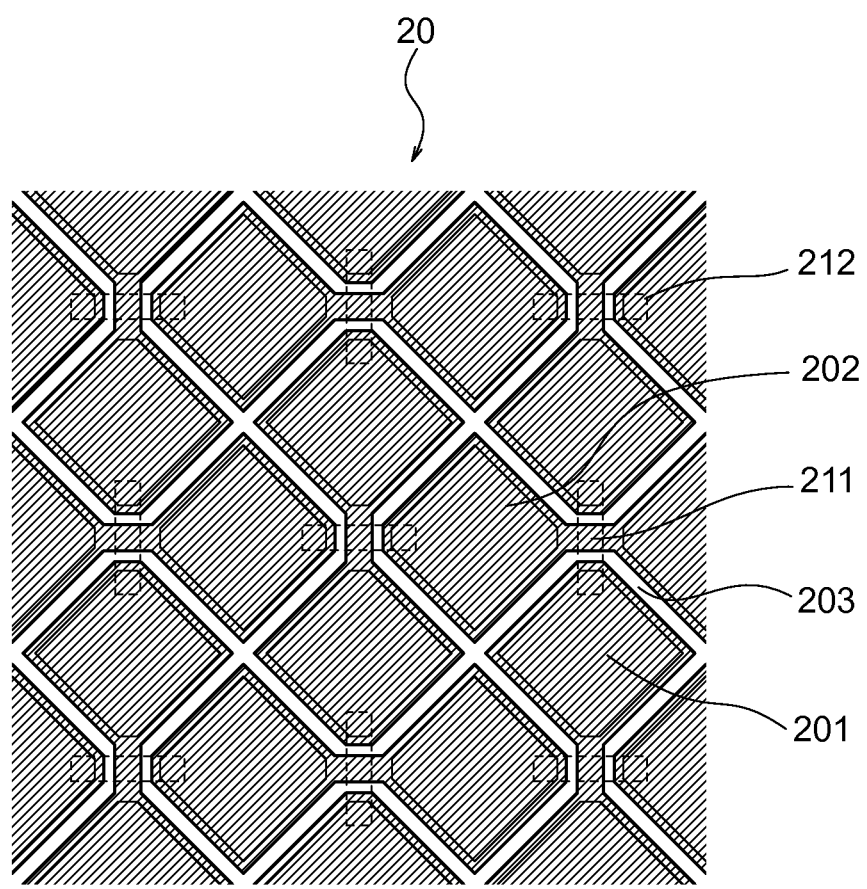
FIG. 5 is a plan view showing a touch sensor board according to a second exemplary embodiment of the present invention.

FIG. 5 is a plan view showing a touch sensor board 20 according to a second exemplary embodiment of the present invention. The structure of the touch sensor board 20 is equivalent to that of the touch sensor board 10 according to the first exemplary embodiment described above in terms of the basic concept, so that different points with respect to the first exemplary embodiment will be described herein.

In the touch sensor board 20, first electrodes 201 and second electrodes 202 are formed on a transparent board to be neighboring to each other with a space provided therebetween on a same plane with a same layer. An interlayer film 203 for insulation is formed between the first electrodes 201 and the second electrodes 202. Further, same-layer connection patterns 211 and different-layer connection patterns 212 electrically connect each of the electrode elements (in a rhombic shape or the like), thereby forming the first electrodes 201 and the second electrodes 202. Each of the above-described elements is the same as the elements under the same names in the touch sensor board 10 according to the first exemplary embodiment described above except for the different points to be described in the followings.

The touch sensor board 20 is designed to be in a structure with which there is no specific restriction set for using the same-layer connection pattern 211 or the different-layer connection pattern 212 when extending the first electrodes 201 or the second electrodes 202. This point is different from the case of the first exemplary embodiment. The sectional shapes of the same-layer connection pattern 211 and the different-layer connection pattern 212 are equivalent to the case of the first exemplary embodiment shown in FIGS. 2A to 2B. Further, the manufacturing steps and the like are also the same as those of the first exemplary embodiment shown in FIG. 3.

When the sensor electrodes (the first electrodes 201 and the second electrodes 202) are formed by ITO or the like, the resistance value is decreased as the film thickness is increased so that the electric current can be easily flown therethrough. However, at the same time, the light transmittance becomes decreased, so that light cannot be transmitted easily. Thus, it is necessary to determine the film thickness for acquiring high transmission and low resistance in a well-balanced manner. The same-layer connection patterns 211 are formed with a same material and film thickness as those of the sensor electrodes, so that the resistance value thereof becomes the same as that of the sensor electrodes.

In the meantime, the different-layer connection patterns 212 are formed in "step S101" of the manufacturing steps shown in FIG. 3. This is a different step from "step S103" in which the first electrodes 201, the second electrodes 202, and the same-layer connection patterns 211 are formed collectively. Thus, the different-layer connection patterns 212 alone can be formed with different film thickness and film material from those of the first electrodes 201, the second electrodes 202, and the same-layer connection patterns 211, so that it is possible to acquire a still lower resistance value. Therefore, through designing the different-layer connection patterns 212 to be of low resistance and to be used in a longer wiring distance, the entire wiring resistance can be made as low.

Further, as shown in FIG. 5, through employing the structure of the first electrodes 201 where the electrode element (a rhombic shape or the like)-the same-layer connection pattern 211-the electrode element-the different-layer connection pattern 212,—are alternately disposed and connected and employing the structure of the second electrodes 202 where the those are alternately disposed and connected in a same manner, the wiring resistance per unit area can be made equivalent.

That is, with the exemplary embodiment, it is possible to achieve both the structure capable of "making the entire wiring resistance as low" and the structure capable of making "the wiring resistance per unit area equivalent". Either of the structures may be selected and employed according to the conditions of the position detection circuit and the like.

Third Exemplary Embodiment

Figure 6:
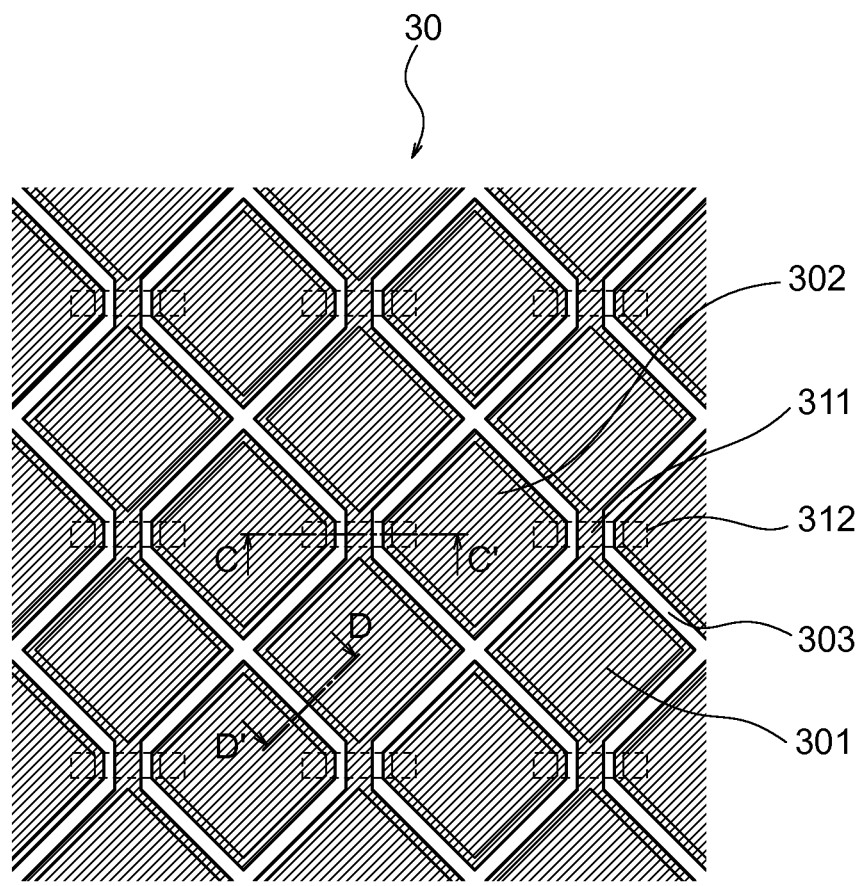
FIG. 6 is a plan view showing a touch sensor board according to a third exemplary embodiment of the present invention.

FIG. 6 is a plan view showing a touch sensor board 30 according to a third exemplary embodiment of the present invention. The structure of the touch sensor board 30 is equivalent to that of the touch sensor board 10 according to the first exemplary embodiment described above in terms of the basic concept, so that different points with respect to the first exemplary embodiment will be described herein.

In the touch sensor board 30, first electrodes 301 and second electrodes 302 are formed on a transparent board 305 to be neighboring to each other with a space provided therebetween on a same plane with a same layer. An interlayer film 303 for insulation is formed between the first electrodes 301 and the second electrodes 302. Further, same-layer connection patterns 311 and different-layer connection patterns 312 electrically connect each of the electrode elements (in a rhombic shape or the like), thereby forming the first electrodes 301 and the second electrodes 302. Each of the above-described elements is the same as the elements under the same names in the touch sensor board 10 according to the first exemplary embodiment described above except for the different points described in the followings.

Figure 7A:
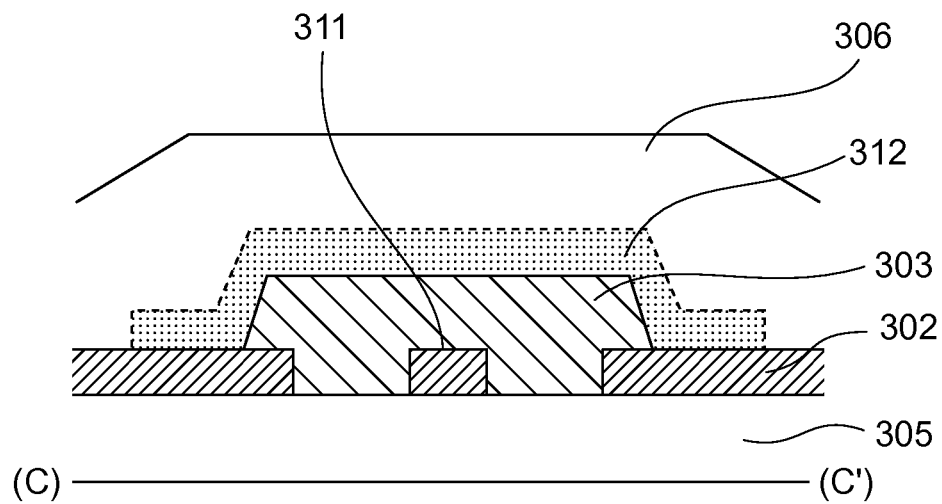
FIG. 7A is a sectional view taken along a line C-C' of FIG. 6.
Figure 7B:
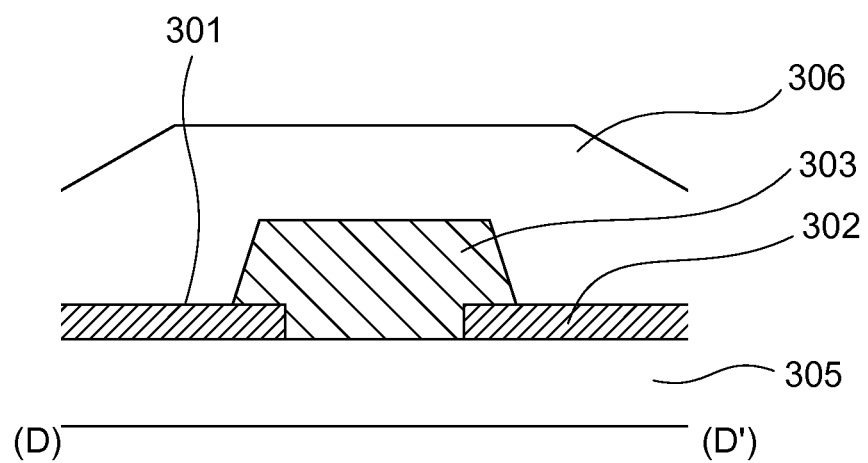
FIG. 7B is a sectional view taken along a line D-D' of FIG. 6.
Figure 8:
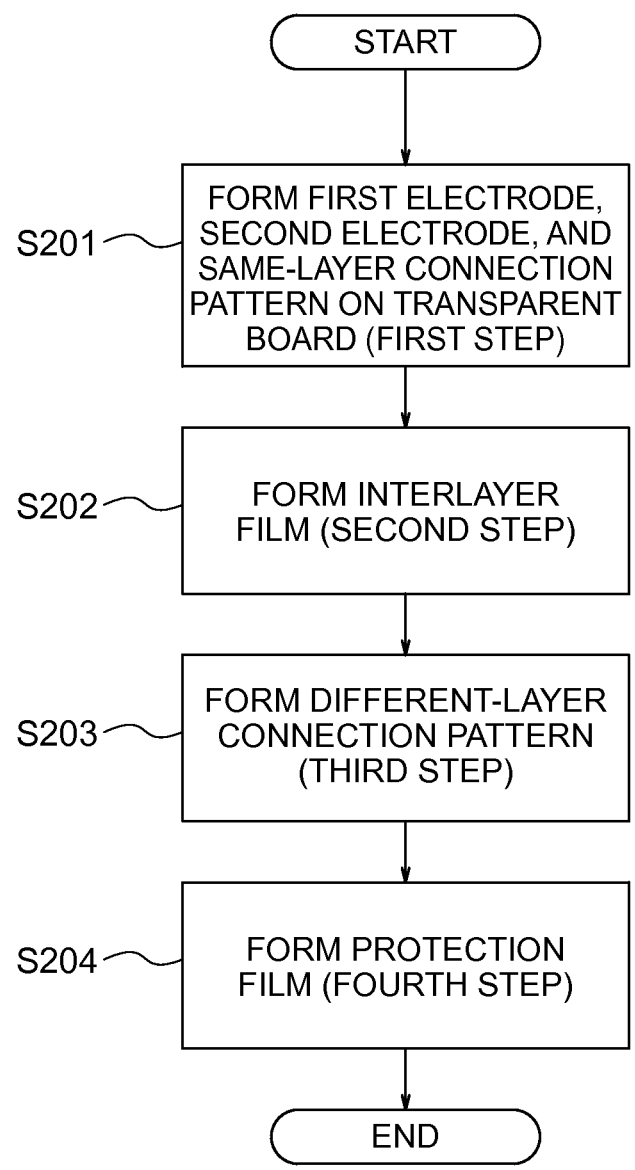
FIG. 8 is a flowchart showing a manufacturing method of the touch sensor board shown in FIGS. 6 and 7A-7B.

FIG. 7A is a sectional view taken along a line C-C' of FIG. 6, and FIG. 7B is a sectional view taken along a line D-D' of FIG. 6. FIG. 8 is a flowchart showing a manufacturing method of the touch sensor board 30 shown in FIGS. 6 and 7A-7B. In the touch sensor board 30, each of the layers is formed in a different order with that of the touch sensor board 10 according to the first exemplary embodiment.

First, the first electrodes 301 and the second electrodes 302 as the sensor electrode patterns as well as the same-layer connection patterns 311 are formed on the transparent board 305 (step S201: a first step). Then, the interlayer film 303 is formed over the formed first electrodes 301, the second electrodes 302, and the same-layer connection patterns 311 (step S202: a second step). As in the case of the first exemplary embodiment, the interlayer film 303 is formed in such pattern that the sensor electrode patterns overlap with the interlayer film 303.

Subsequently, the different-layer connection patterns 312 are formed on the formed interlayer film 303 (step S203: a third step). When forming the different-layer connection patterns 312 with PEP, the sensor electrode patterns formed in step S201 are exposed. Thus, the sensor electrode patterns are formed with a material that exhibits selectivity for the etching processing executed in step S203.

For example, when ITO is used in step S201, the etching processing in the third step is executed by using a conductive material such as chrome, a molybdenum alloy, or an aluminum alloy in step S203 by using an etching solution with which ITO is not etched.

This makes it possible to keep the original ITO pattern acquired in step S201 even though it is not covered by an insulating film. Thus, only the film in step S203 is etched to form a desired different-layer connection patterns.

Further, both of the films formed in step S201 and step S203 may be formed as ITO films. In such case, the fact that the etching speed varies for the ITO film deposited at a normal temperature and for the heated ITO film is utilized. That is, when ITO is deposited at a normal temperature, it is amorphous. In the meantime, when ITO is heated, crystalline thereof becomes high and it turns into a polycrystalline. Thus, the etching speed becomes slow.

Therefore, the ITO pattern of step S201 may be formed by performing heat deposition of about 200 to 300° C., annealing processing may be added to the ITO pattern formed by normal-temperature deposition, or it may be heated to 200 to 250° C. in a calcination step of the acryl resin in step S202 to be formed in a high crystalline state. In such state, etching processing is performed in step S203 on the ITO film formed by normal-temperature deposition.

Therefore, the order in the layer structures can be inverted without increasing the manufacturing steps or the layer structures. With this, it is also possible to acquire the same effect as that of the first exemplary embodiment. At last, the protection film 306 is formed on the formed different-layer connection patterns 312 in the same manner as that of step S104 (a fourth step) of FIG. 3. Thereby, the touch sensor board 30 is completed.

Fourth Exemplary Embodiment

In a touch sensor board 40 according to a fourth exemplary embodiment of the present invention, an interlayer film is formed by stacking a plurality of transparent insulating materials. More specifically, the interlayer film is formed by stacking first and second interlayer films 403 and 404 made with a transparent insulating material, and the film thickness of the first interlayer film on the farther side than the touch side of the screen is formed thicker than that of the second interlayer film.

Further, the second interlayer film is formed by a silicon nitride film, and the first and second electrodes are formed by indium tin oxide. Furthermore, the film thickness of the second interlayer film is formed to be equivalent to that of the first and second electrodes.

Through having the above-described structure, the touch sensor board 40 becomes capable of improving not only the difference in the transmittance characteristics between the sensor electrodes and the interlayer film but also deterioration in the visibility of the screen caused due to the difference in the reflection characteristic.

Hereinafter, this will be described in more details.

Figure 9:
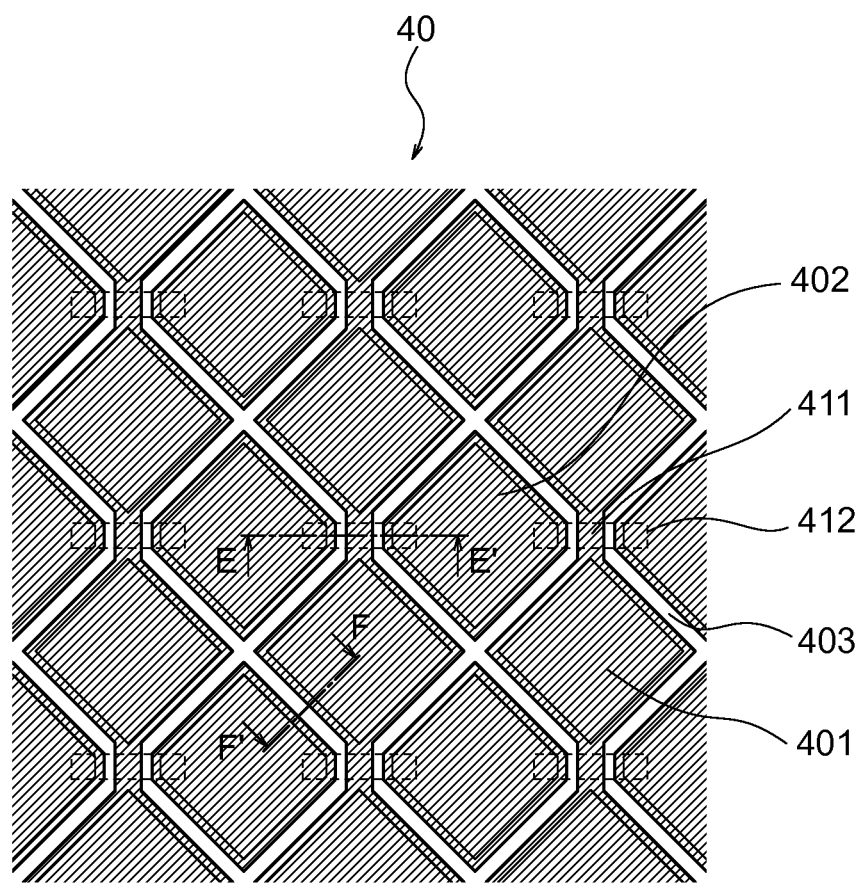
FIG. 9 is a plan view showing a touch sensor board according to a fourth exemplary embodiment of the present invention.

FIG. 9 is a plan view showing the touch sensor board 40 according to the fourth exemplary embodiment of the present invention. The structure of the touch sensor board 40 is equivalent to that of the touch sensor board 10 according to the first exemplary embodiment described above in terms of the basic concept, so that different points with respect to the first exemplary embodiment will be described herein.

In the touch sensor board 40, first electrodes 401 and second electrodes 402 are formed on a transparent board 405 to be neighboring to each other with a space provided therebetween on a same plane with a same layer. An interlayer film for insulation is formed between the first electrodes 401 and the second electrodes 402. Further, same-layer connection patterns 411 and different-layer connection patterns 412 electrically connect each of the electrode elements (in a rhombic shape or the like), thereby forming the first electrodes 401 and the second electrodes 402. Each of the above-described elements is the same as the elements under the same names in the touch sensor board 10 according to the first exemplary embodiment described above except for the different points described in the followings.

Figure 10A:
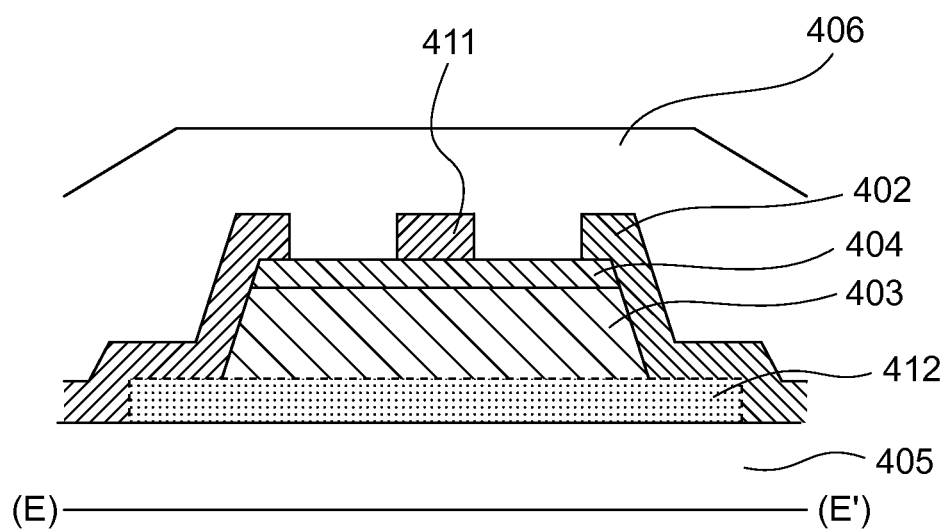
FIG. 10A is a sectional view taken along a line E-E' of FIG. 9.
Figure 10B:
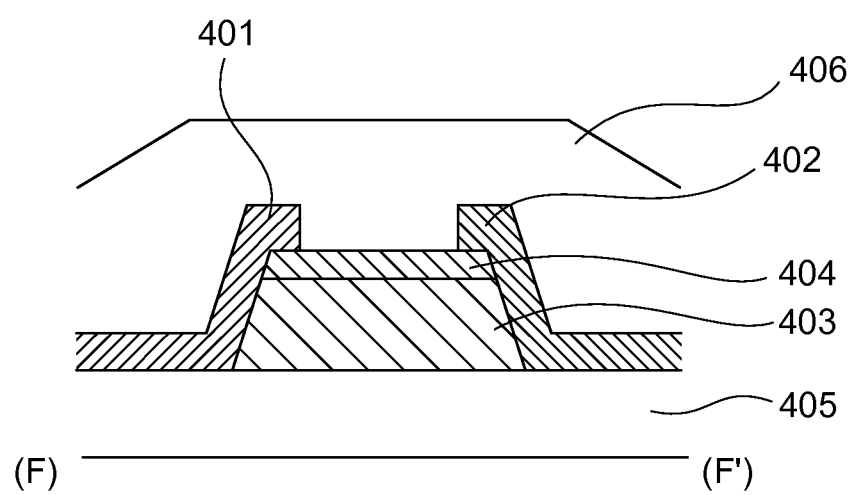
FIG. 10B is a sectional view taken along a line F-F' of FIG. 9.

FIG. 10A is a sectional view taken along a line E-E' of FIG. 9, and FIG. 10B is a sectional view taken along a line F-F' of FIG. 9. The touch sensor board 40 is different from the board of the first exemplary embodiment in respect that the interlayer film is formed by stacking two layers of the first interlayer film 403 and the second interlayer film 404. The first interlayer film 403 is formed as a lower layer in a still thicker film thickness by a transparent insulating film such as an acryl resin or a polyimide resin. The second interlayer film 404 is formed as an upper layer by a transparent insulating material such as a silicon nitride oxide (SiNx).

In the first to third exemplary embodiments described above, shown is a method which overcomes the issue of deterioration in the visibility of the display screen caused due to the difference in the optical characteristic between the sensor electrodes and the interlayer film by achieving the equivalent transmission characteristics. However, there is no reference made in those exemplary embodiments regarding the difference in the reflection characteristics between the sensor electrodes and the interlayer film. The fourth exemplary embodiment is designed to overcome that issue.

That is, as in the case of the first exemplary embodiment, the film transmittance of the first electrodes 401 and the second electrodes 402 and the film transmittance of the first interlayer film 403 and the second interlayer film 404 are set to be equivalent. Further, the material and the thickness of the second interlayer film 404 are selected so that the refractive index of the first electrodes 401 and the second electrodes 402 and that of the second interlayer film 404 can become equivalent.

As a way of example, there is considered a case where the first electrodes 401 and the second electrodes 402 are formed by ITO in film thickness of 20 to 40 nm, and the first interlayer film 403 is formed in thickness of about 2 μm by an acryl resin. For the second interlayer film 404 in such case, it is preferable to select a material which exhibits no wavelength dependency in the visible light region of about 300 to 700 nm wavelengths, is transparent, and has a refractive index equivalent to that of ITO.

The refractive index of ITO is 2.1 to 2.2. Thus, as a material for the second interlayer film 404, it is possible to use a silicon nitride film whose refractive index is about 2.0, for example. Further, in order to decrease the influence of the property of the secondary reflection and thereafter, it is desirable to form the second interlayer film 404 in film thickness equivalent to that of the first electrodes 401 and the second electrodes 402.

Note that the manufacturing steps of the touch sensor board 40 are the same as the case of the first exemplary embodiment except that the first interlayer film 403 and the second interlayer film 404 are formed continuously in step S102 of FIG. 3 where the interlayer film is formed.

Fifth Exemplary Embodiment

Figure 11:
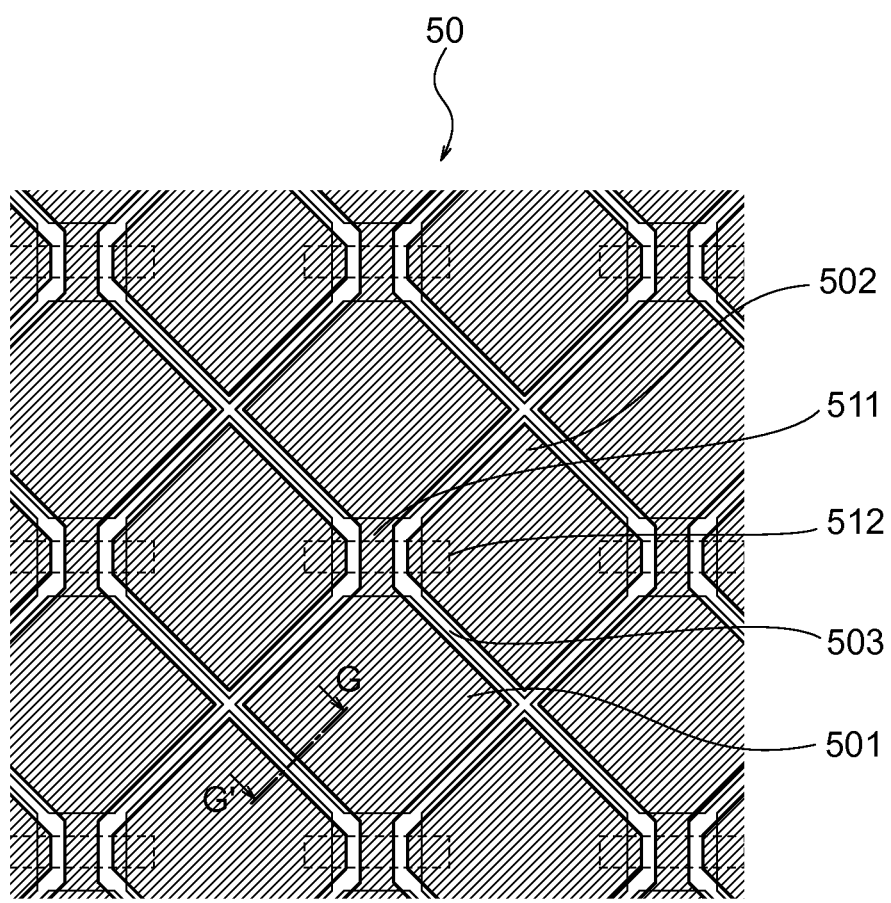
FIG. 11 is a plan view showing a touch sensor board according to a fifth exemplary embodiment of the present invention.
Figure 12:
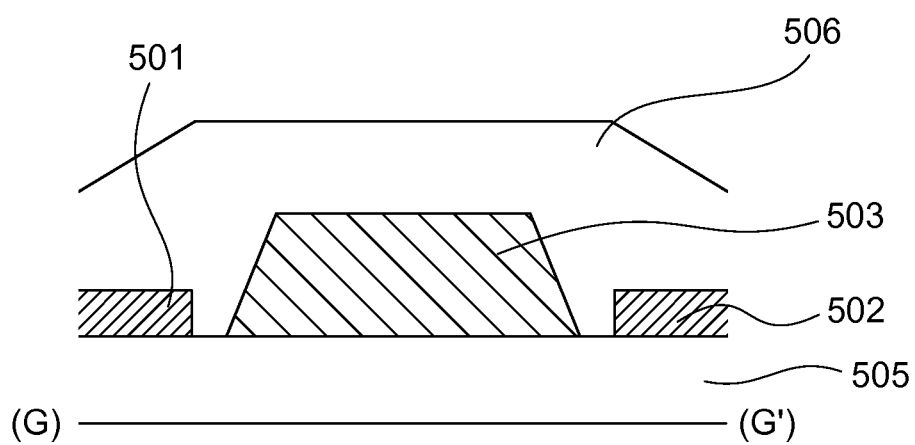
FIG. 12 is a sectional view taken along a line G-G' of FIG. 11.

FIG. 11 is a plan view showing a touch sensor board 50 according to a fifth exemplary embodiment of the present invention. FIG. 12 is a sectional view taken along a line G-G' of FIG. 11. The structure of the touch sensor board 50 is equivalent to that of the touch sensor board 10 according to the first exemplary embodiment described above in terms of the basic concept, so that different points with respect to the first exemplary embodiment will be described herein.

In the touch sensor board 50, first electrodes 501 and second electrodes 502 are formed on a transparent board to be neighboring to each other with a space provided therebetween on a same plane with a same layer. An interlayer film 503 for insulation is formed between the first electrodes 501 and the second electrodes 502. Further, same-layer connection patterns 511 and different-layer connection patterns 512 electrically connect each of the electrode elements (in a rhombic shape or the like), thereby forming the first electrodes 501 and the second electrodes 502. Each of the above-described elements is the same as the elements under the same names in the touch sensor board 10 according to the first exemplary embodiment described above except for the different points described in the followings.

The difference with respect to the first exemplary embodiment is that: the interlayer film 503 is formed in the intersections between the same-layer connection patterns 511 and the different-layer connection patterns 512 and in the space between the first electrodes 501 and the second electrodes 502 formed neighboring to each other by being electrically insulated; and the interlayer film 503 is formed in a pattern to be continued inside the space thereof with a gap provided between with the sensor electrodes (the first electrodes 501 or the second electrodes 502) so that the pattern end of the interlayer film 503 does not cross the space between the first electrodes 501 and the second electrodes 502.

In the fifth exemplary embodiment, the end part of the interlayer film 503 exists in the space between the sensor electrodes (the first electrodes 501 or the second electrodes 502). However, the end part of the interlayer film 503 is formed not to cross the space between the neighboring sensor electrodes. Thus, it is possible to acquire such an effect that short-circuit does not occur even if there is a film remained along the pattern end of the interlayer film.

Sixth Exemplary Embodiment

Figure 13:
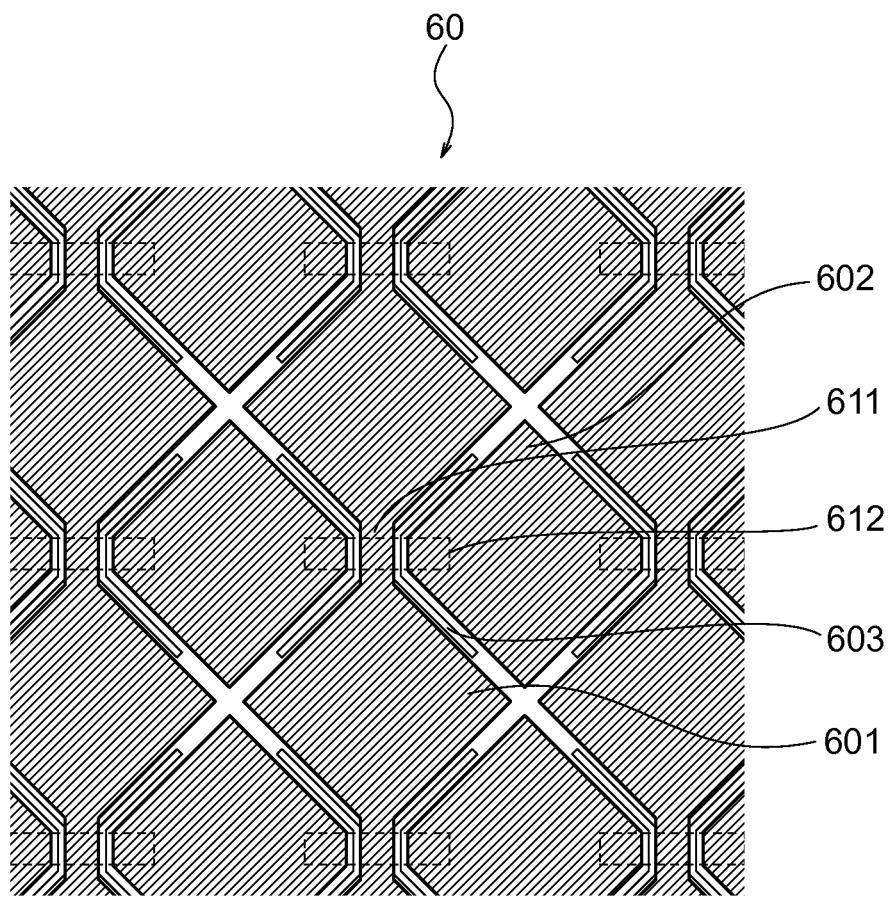
FIG. 13 is a plan view showing a touch sensor board according to a sixth exemplary embodiment of the present invention.

FIG. 13 is a plan view showing a touch sensor board 60 according to a sixth exemplary embodiment of the present invention. The structure of the touch sensor board 60 is equivalent to that of the touch sensor board 10 according to the first exemplary embodiment described above in terms of the basic concept, so that different points with respect to the first exemplary embodiment will be described herein.

In the touch sensor board 60, first electrodes 601 and second electrodes 602 are formed on a transparent board to be neighboring to each other with a space provided therebetween on a same plane with a same layer. An interlayer film 603 for insulation is formed between the first electrodes 601 and the second electrodes 602. Further, same-layer connection patterns 611 and different-layer connection patterns 612 electrically connect each of the electrode elements (in a rhombic shape or the like), thereby forming the first electrodes 601 and the second electrodes 602. Each of the above-described elements is the same as the elements under the same names in the touch sensor board 10 according to the first exemplary embodiment described above except for the different points described in the followings.

The difference with respect to the first exemplary embodiment is that: the interlayer film 603 is formed in the intersections between the same-layer connection patterns 611 and the different-layer connection patterns 612 and in the space between the first electrodes 601 and the second electrodes 602 formed neighboring to each other by being electrically insulated; and the interlayer film 603 is formed in such a pattern that the pattern end of the interlayer film 603 does not cross the space between the first electrodes 601 and the second electrodes 602 and does not overlap with the second electrodes 602 electrically connected via the different-layer connection patterns 612.

In the sixth exemplary embodiment, the end part of the interlayer film 603 exists in the space between the sensor electrodes (the first electrodes 601 or the second electrodes 602). The end part of the interlayer film 603 is not formed to cross the space between the first sensor electrodes 601 and the second sensor electrodes 602. However, it is formed to cross from the sensor electrode connected to the same-layer connection pattern 611 to the different-layer connection pattern 612.

Thus, a leak path is formed when a film is remained along the pattern end of the interlayer film. However, the crossing path is not at least the shortest path, so that the resistance of the leak path becomes high and the leak path also becomes a long path. Further, the path is a path for connecting to the different-layer connection pattern 612, so that a contact resistance is also added. Therefore, there is almost no influence by the leak path, and there is an effect of decreasing short-circuit generated between the first electrodes 601 and the second electrodes 602.

Seventh Exemplary Embodiment

Figure 14:
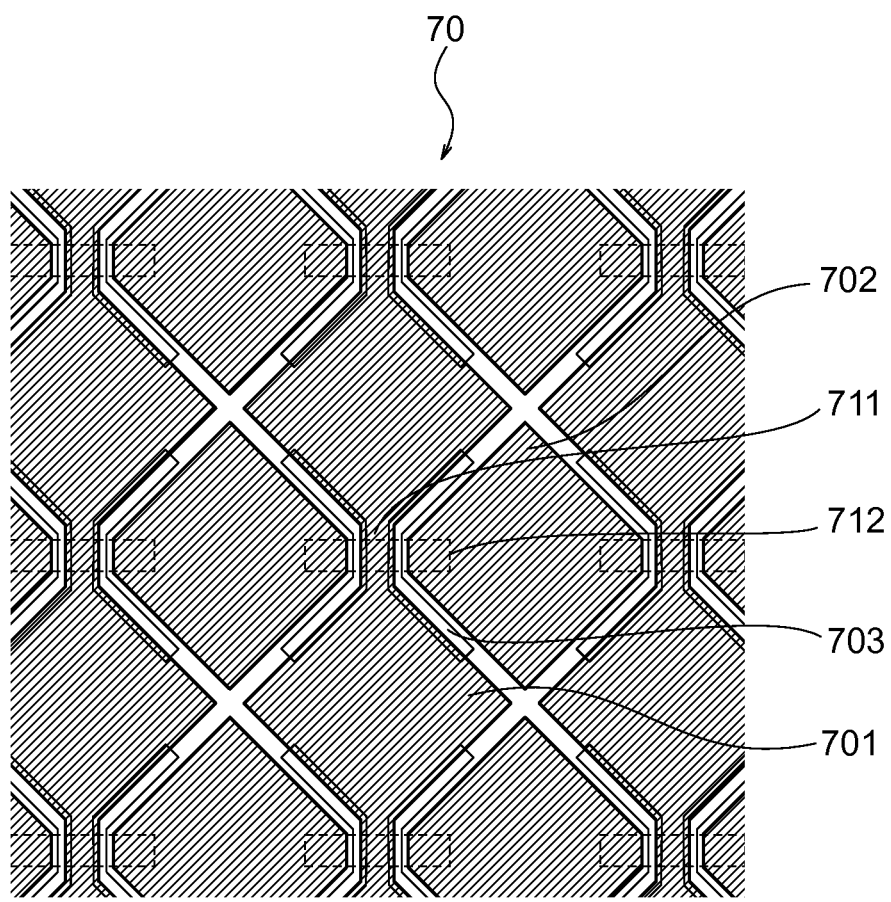
FIG. 14 is a plan view showing a touch sensor board according to a seventh exemplary embodiment of the present invention.

FIG. 14 is a plan view showing a touch sensor board 70 according to a seventh exemplary embodiment of the present invention. The structure of the touch sensor board 70 is equivalent to that of the touch sensor board 10 according to the first exemplary embodiment described above in terms of the basic concept, so that different points with respect to the first exemplary embodiment will be described herein.

In the touch sensor board 70, first electrodes 701 and second electrodes 702 are formed on a transparent board to be neighboring to each other with a space provided therebetween on a same plane with a same layer. An interlayer film 703 for insulation is formed between the first electrodes 701 and the second electrodes 702. Further, same-layer connection patterns 711 and different-layer connection patterns 712 electrically connect each of the electrode elements (in a rhombic shape or the like), thereby forming the first electrodes 701 and the second electrodes 702. Each of the above-described elements is the same as the elements under the same names in the touch sensor board 10 according to the first exemplary embodiment described above except for the different points described in the followings.

The seventh exemplary embodiment is the same as the sixth exemplary embodiment described above. The difference with respect to the sixth exemplary embodiment is that the interlayer film 703 disposed in the space between the sensor electrodes (the first electrodes 701 and the second electrodes 702) is formed to have an overlapping region with the first electrode 701 that is electrically connected via the same-layer connection pattern 711. With this, it is also possible to acquire the same effect as that of the sixth exemplary embodiment.

(Use Mode)

Figure 15:
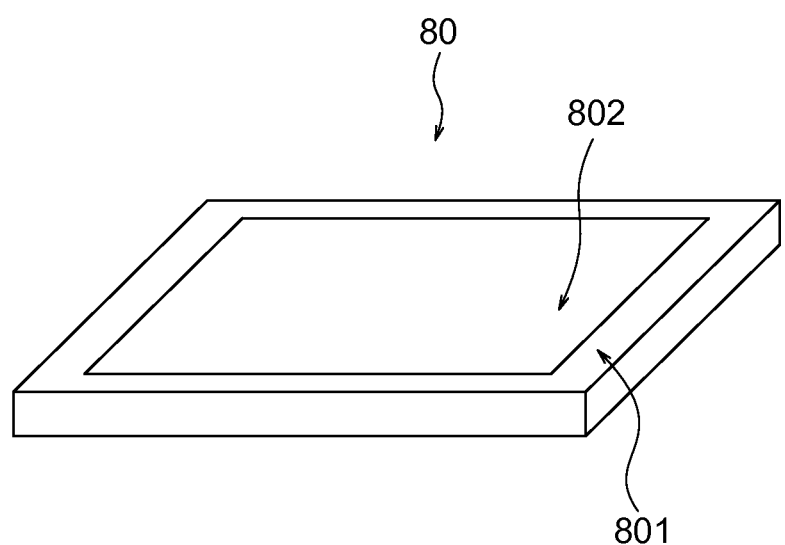
FIG. 15 is an explanatory chart showing the external appearance of an image display device that is a specific use mode of the touch sensor boards according to the first to seventh exemplary embodiments of the present invention.
Figure 16:
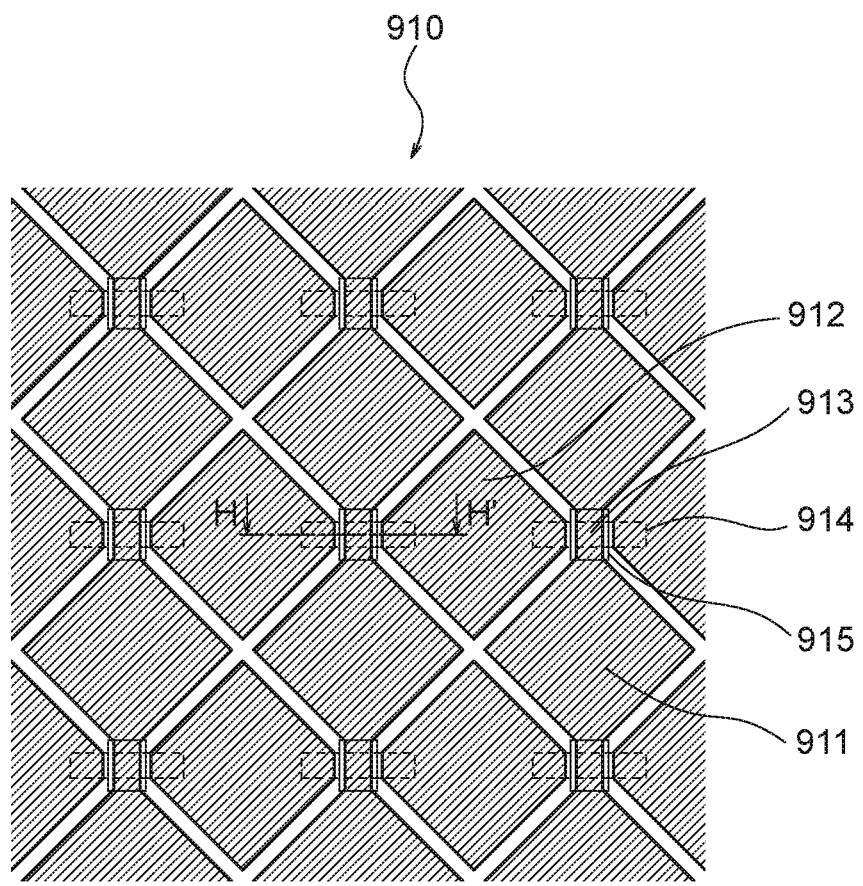
FIG. 16 is a plan view showing the structure of a touch sensor board (according to Existing Technique 1) depicted in Patent Document 1.
Figure 17:
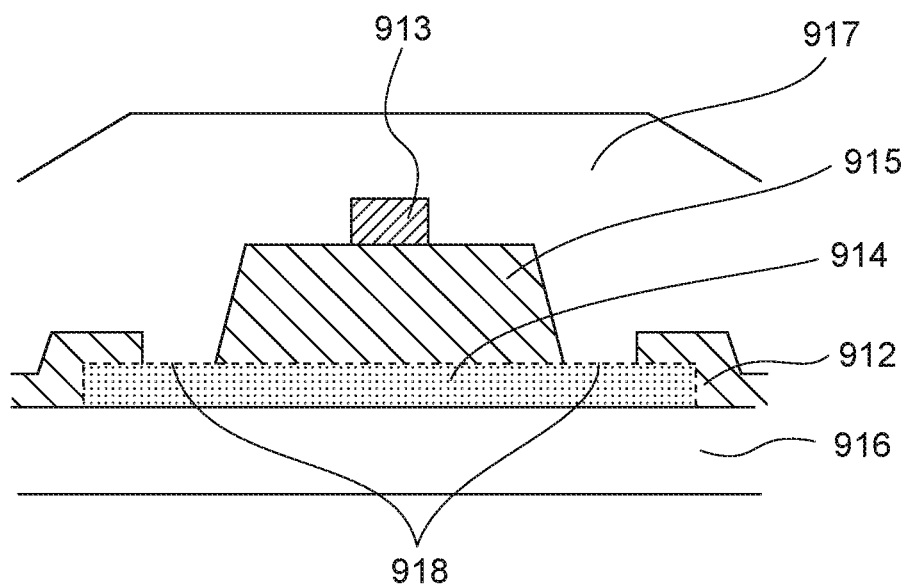
FIG. 17 is a sectional view taken along a line H-H' of FIG. 16.
Figure 18:
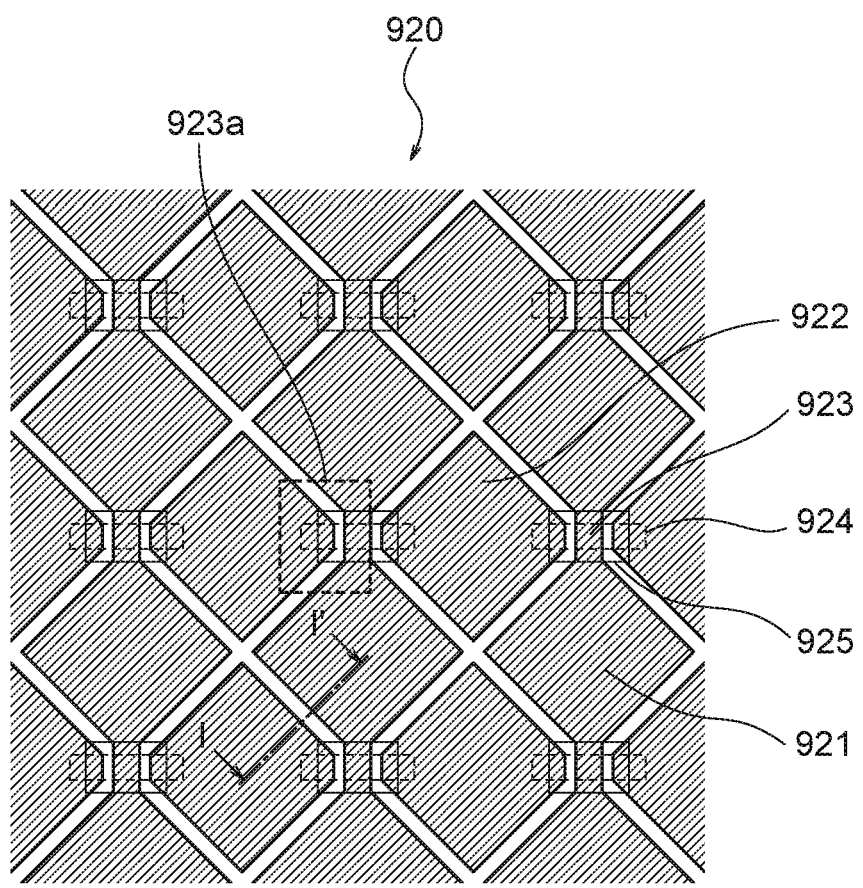
FIG. 18 is a plan view showing the structure of a touch sensor board (according to Existing Technique 2) depicted in Patent Document 2.
Figure 19:
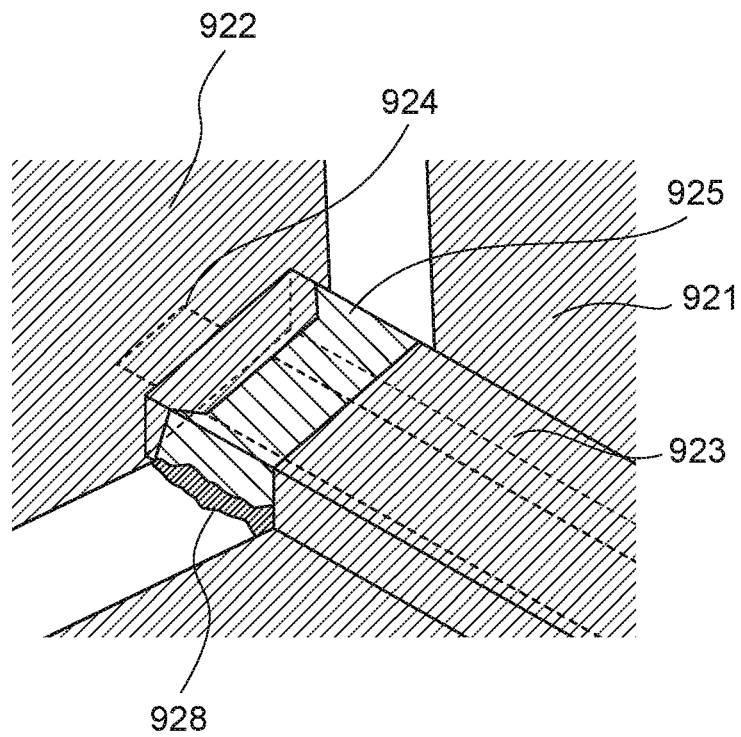
FIG. 19 is an enlarged perspective view showing an end vicinity region of a same-layer connection pattern of the touch sensor board shown in FIG. 18.
Figure 20:
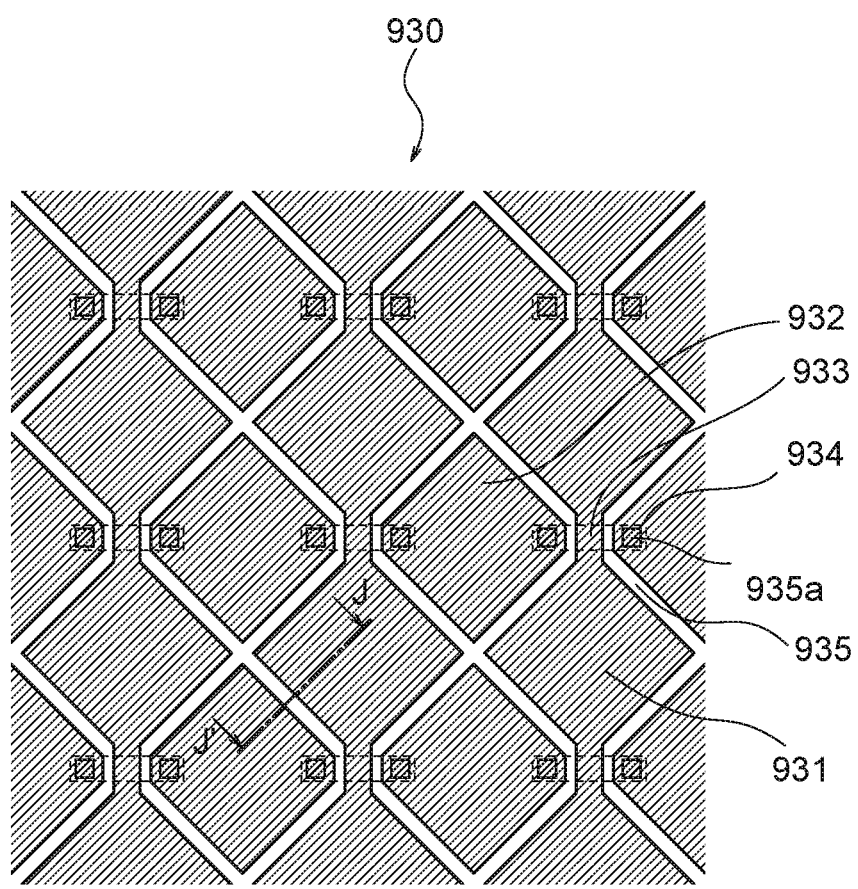
FIG. 20 is a plan view showing the structure of a touch sensor board (according to Existing Technique 3) depicted in Patent Document 3.
Figure 21:
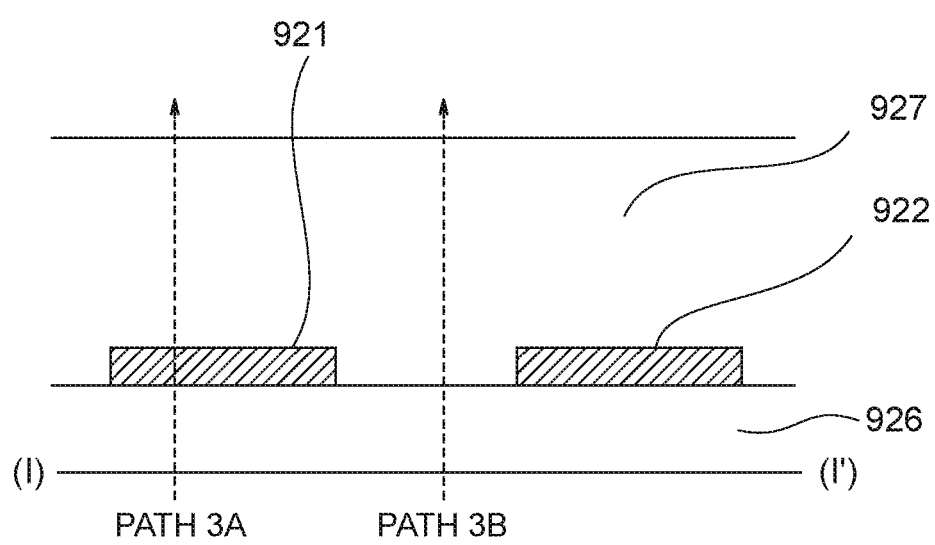
FIG. 21 is a sectional view showing a sectional shape taken along a line I-I' of FIG. 18 (Existing Technique 2)
Figure 22:
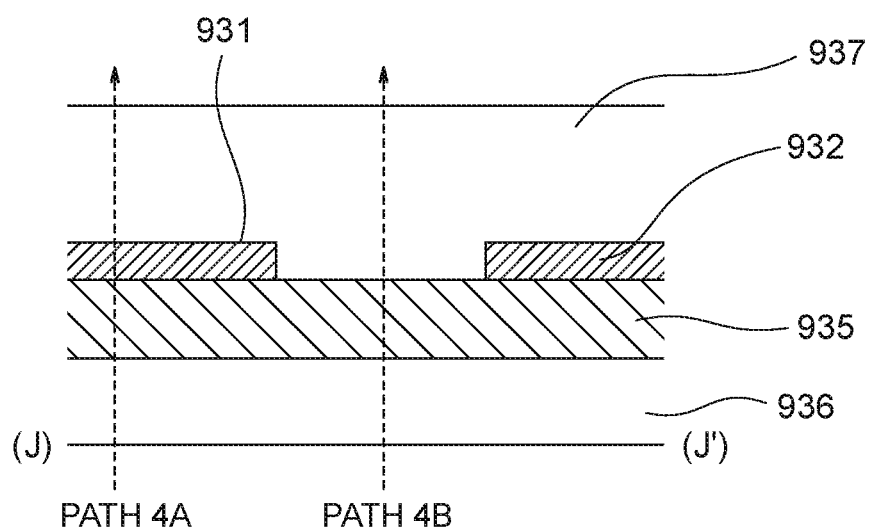
FIG. 22 is a sectional view showing a sectional shape taken along a line J-J' of FIG. 20 (Existing Technique 3).

FIG. 15 is an explanatory chart showing the external appearance of an image display device 80 that is a specific use mode of the touch sensor boards 10 to 70 according to the first to seventh exemplary embodiments of the present invention. The image display device 80 is a structure in which a touch sensor board 802 is laminated on the surface of a liquid crystal display panel 801 for making it possible to accept, by the touch sensor board 802, input operations done by the user by corresponding to the content displayed on the liquid crystal display panel 801. The touch sensor board 802 is one of the touch sensor boards 10 to 70 according to the first to seventh exemplary embodiments of the present invention described above.

A processing module for processing the information inputted through the touch sensor board 802 and displaying the processed result on the liquid crystal display panel 801 may be built inside the image display device 80 or may be an external device thereof. Therefore, the processing module is not illustrated in FIG. 15.

It is the general principle to dispose the touch sensor board 802 on the front face of the liquid crystal display panel 801. However, it is also possible to employ an on-cell type in which the touch sensor board is formed on the liquid crystal display panel 801 or an in-cell type in which the touch sensor board is formed inside thereof. Further, it is possible to provide a protection member such as a protection film or a cover glass on the face of the side where the user touches. Also, the liquid crystal display panel may be the other display panel which uses such as an organic EL.

While the present invention has been described heretofore by referring to the specific exemplary embodiments shown in the drawings, the present invention is not limited to the exemplary embodiments shown in the drawing. Any other known structures can be employed as long as the effects of the present invention can be achieved therewith.

The whole or part of the exemplary embodiments disclosed above can be described as, but not limited to, the following Supplementary Notes:

(Supplementary Note 1)

A static capacitive type touch sensor board formed on a transparent board, including:

a plurality of mutually parallel first electrodes extendedly provided by connecting polygonal electrode elements on a same layer of the transparent board along a first direction via connection patterns; and a plurality of mutually parallel second electrodes extendedly provided by connecting polygonal electrode elements on the same layer as that of the first electrodes along a second direction via connection patterns, wherein:

regarding the electrode elements of the first and second electrodes, each of the electrode elements that are electrically equivalent is connected via a same-layer connection pattern or a different-layer connection pattern, and the same-layer connection pattern and the different-layer connection pattern overlap with each other via an interlayer film that is formed by an insulator; and the interlayer film is continued from a part where the same-layer connection pattern and the different-layer connection pattern overlap with each other via a gap part between each of the electrode elements, the interlayer film is formed to be continued in the gap part, and the interlayer film is not formed practically in a region where the first and second electrodes are formed.

(Supplementary Note 2)

The touch sensor board as depicted in Supplementary Note 1, wherein the interlayer film is formed either in an overlapping state between with the first electrode patterns or the second electrode patterns or in a state having a space therebetween.

(Supplementary Note 3)

The touch sensor board as depicted in Supplementary Note 2, wherein the interlayer film is formed in a shape which includes region that overlaps with all the electrode elements and in a shape filled in the entire gap part between the electrode elements neighboring to each other.

(Supplementary Note 4)

The touch sensor board as depicted in Supplementary Note 2, wherein the interlayer film is formed in a shape which sections all the first electrodes and the second electrodes and continues to surround the first and second electrodes.

(Supplementary Note 5)

The touch sensor board as depicted in any one of Supplementary Notes 1, 2, and 4, wherein the interlayer film, the same-layer connection pattern, and one of the patterns of the first and second electrodes are formed in a shape to cover the different-layer connection pattern.

(Supplementary Note 6)

The touch sensor board as depicted in Supplementary Note 1 or 2, wherein the interlayer film is formed to overlap only with either one of the first and second electrodes.

(Supplementary Note 7)

The touch sensor board as depicted in any one of Supplementary Notes 1 to 6, wherein the interlayer film is formed by stacking a plurality of transparent insulating materials.

(Supplementary Note 8)

The touch sensor board as depicted in Supplementary Note 7, wherein:

the interlayer film is formed by stacking a first and a second interlayer films of the transparent insulating material; and film thickness of the first interlayer film on a side farther than a side where a user touches is thicker than film thickness of the second interlayer film.

(Supplementary Note 9)

The touch sensor board as depicted in Supplementary Note 8, wherein the second interlayer film is formed by a silicon nitride film, and the first and second electrodes are formed by indium tin oxide.

(Supplementary Note 10)

The touch sensor board as depicted in Supplementary Note 9, wherein the film thickness of the second interlayer film is formed to be equivalent to film thickness of the first and second electrodes.

(Supplementary Note 11)

The touch sensor board as depicted in any one of Supplementary Notes 1 to 10, wherein the different-layer connection pattern is formed by a transparent conductive material.

(Supplementary Note 12)

An image display device including, on a front face of a display panel for displaying image information, a touch sensor board capable of performing an input operation corresponding to a content displayed on the display panel, wherein the touch sensor board is the touch sensor board as depicted in any one of Supplementary Notes 1 to 11.

(Supplementary Note 13)

A manufacturing method of a static capacitive type touch sensor board, the method including:

a step of forming first connection patterns by a conductive material on the board;

a step of forming an interlayer film by an insulator on the first connection patterns;

a step of forming polygonal electrode elements and second connection patterns on the interlayer film, taking a part of the electrode elements as a plurality of mutually parallel first electrodes extendedly provided by being connected via the first connection patterns along a first direction, and taking remainder of the electrode elements as a plurality of mutually parallel second electrodes extendedly provided by being connected via the second connection patterns along a second direction while being insulated from the first electrodes by the interlayer film, wherein the interlayer film is continued from a part where the first connection patterns and the second connection patterns overlap with each other via a gap part between each of the electrode elements, and the interlayer film is formed to be continued in the gap part.

(Supplementary Note 14)

A manufacturing method of a static capacitive type touch sensor board, the method including:

a step of forming polygonal electrode elements and first connection patterns on the board, and taking a part of the electrode elements as a plurality of mutually parallel first electrodes extendedly provided by being connected via the first connection patterns along a first direction;

a step of forming an interlayer film by an insulator on the first electrodes;

a step of forming second connection patterns on the interlayer film, and taking remainder of the electrode elements as a plurality of mutually parallel second electrodes extendedly provided by being connected via the second connection patterns along a second direction while being insulated from the first electrodes by the interlayer film, wherein the interlayer film is continued from a part where the first connection patterns and the second connection patterns overlap with each other via a gap part between each of the electrode elements, and the interlayer film is formed to be continued in the gap part.

INDUSTRIAL APPLICABILITY

The present invention can be applied broadly in electronic apparatuses provided with a touch panel formed by laminating a liquid crystal display panel and a touch sensor board. More specifically, the present invention can be applied to the electronic apparatuses such as smartphones, tablets, notebook-type personal computers, desktop-type personal computers, feature phones (conventional flip-type mobile phones as opposed to smartphones), mobile music players, mobile game machines, mobile televisions, car navigation systems, and wrist watches.

What is claimed is:

1. A static capacitive type touch sensor board formed on a transparent board, comprising:
   a plurality of mutually parallel first electrodes provided by connecting polygonal electrode elements on a same layer of the transparent board along a first direction via connection patterns; and
   a plurality of mutually parallel second electrodes provided by connecting polygonal electrode elements on the same layer as that of the first electrodes along a second direction via connection patterns, wherein:
   regarding the electrode elements of the first and second electrodes, each of the electrode elements that are electrically equivalent is connected via a same-layer connection pattern or a different-layer connection pattern, and the same-layer connection pattern and the different-layer connection pattern overlap each other via an interlayer film that is formed by an insulator; and
   the interlayer film continues from a part where the same-layer connection pattern and the different-layer connection pattern overlap each other between each of the electrode elements, the interlayer film is formed to fill completely an entire region between the electrode elements which are formed on the same layer of the transparent board, and the interlayer film is formed to overlap edge parts of the electrode elements of the first and second electrodes and not formed practically in a region where the first and second electrodes are formed, wherein:
   the interlayer film is formed by stacking a plurality of transparent insulating materials, the plurality of transparent insulating materials comprising a first and a second interlayer film; and
   a film thickness of the first interlayer film on a side farther than a side where a user touches is thicker than a film thickness of the second interlayer film.

2. The touch sensor board as claimed in claim 1, wherein the interlayer film, the same-layer connection pattern, and one of the patterns of the first and second electrodes are formed in a shape to cover the different-layer connection pattern.

3. The touch sensor board as claimed in claim 1, wherein the second interlayer film is comprises a silicon nitride film, and the first and second electrodes comprise indium tin oxide.

4. The touch sensor board as claimed in claim 3, wherein the film thickness of the second interlayer film is equivalent to the film thickness of the first and second electrodes.

5. The touch sensor board as claimed in claim 1, wherein the different-layer connection pattern comprises a transparent conductive material.

6. An image display device comprising, on a front face of a display panel for displaying image information, a touch sensor board capable of accepting an input operation corresponding to a content displayed on the display panel, wherein
   the touch sensor board is the touch sensor board as claimed in claim 1.

7. A manufacturing method of a static capacitive type touch sensor board formed on a transparent board, the method comprising:
   a step of forming first connection patterns by a conductive material on the transparent board;
   a step of forming an interlayer film by an insulator on the first connection patterns;
   a step of forming polygonal electrode elements and second connection patterns on the interlayer film, taking a part of the electrode elements as a plurality of mutually parallel first electrodes provided by being connected via the first connection patterns along a first direction, and taking remainder of the electrode elements as a plurality of mutually parallel second electrodes provided by being connected via the second connection patterns along a second direction while being insulated from the first electrodes by the interlayer film, wherein
   the interlayer film continues from a part where the first connection patterns and the second connection patterns overlap each other between each of the electrode elements, the interlayer film is formed to fill completely an entire region between the electrode elements which are formed on the same layer of the transparent board, and the interlayer film is formed to overlap edge parts of the electrode elements of the first and second electrodes and not formed practically in a region where the first and second electrodes are formed, wherein
   the interlayer film is formed by stacking a plurality of transparent insulating materials, the plurality of transparent insulating materials comprising a first and a second interlayer film; and a film thickness of the first interlayer film on a side farther than a side where a user touches is thicker than a film thickness of the second interlayer film.

8. A manufacturing method of a static capacitive type touch sensor board formed on a transparent board, the method comprising:
   a step of forming polygonal electrode elements and first connection patterns on the transparent board, and taking a part of the electrode elements as a plurality of mutually parallel first electrodes extendedly provided by being connected via the first connection patterns along a first direction;
   a step of forming an interlayer film by an insulator on the first electrodes;
   a step of forming second connection patterns on the interlayer film, and taking remainder of the electrode elements as a plurality of mutually parallel second electrodes provided by being connected via the second connection patterns along a second direction while being insulated from the first electrodes by the interlayer film, wherein
   the interlayer film continues from a part where the first connection patterns and the second connection patterns overlap each other between each of the electrode elements, the interlayer film is formed fill completely an entire region between the electrode elements which are formed on the same layer of the transparent board, and the interlayer film is formed to overlap edge parts of the electrode elements of the first and second electrodes and not formed practically in a region where the first and second electrodes are formed, wherein
   the interlayer film is formed by stacking a plurality of transparent insulating materials, the plurality of transparent insulating materials comprising a first and a second interlayer film; and a film thickness of the first interlayer film on a side farther than a side where a user touches is thicker than a film thickness of the second interlayer film.

* * * * *